US012623363B2

(12) United States Patent
Heimendinger

(10) Patent No.: US 12,623,363 B2
(45) Date of Patent: May 12, 2026

(54) ELECTRONIC KNIFE AND RELATED SYSTEMS AND METHODS

(71) Applicant: Cuisonic, Inc., Seattle, WA (US)

(72) Inventor: Scott Heimendinger, Seattle, WA (US)

(73) Assignee: Cuisonic, Inc., Seattle, WA (US)

( * ) Notice: Subject to any disclaimer, the term of this patent is extended or adjusted under 35 U.S.C. 154(b) by 133 days.

(21) Appl. No.: 18/768,300

(22) Filed: Jul. 10, 2024

(65) Prior Publication Data

US 2025/0144827 A1 May 8, 2025

Related U.S. Application Data

(63) Continuation of application No. 17/362,755, filed on Jun. 29, 2021, now Pat. No. 12,042,947.

(60) Provisional application No. 63/045,802, filed on Jun. 29, 2020.

(51) Int. Cl.
| *B26B 7/00* | (2006.01) |
| *B25F 5/02* | (2006.01) |
| *G01D 5/24* | (2006.01) |
| *G09B 19/24* | (2006.01) |

(52) U.S. Cl.
CPC .............. *B26B 7/005* (2013.01); *B25F 5/021* (2013.01); *G01D 5/24* (2013.01); *G09B 19/24* (2013.01)

(58) Field of Classification Search
CPC ............ B26B 7/005; B25F 5/021; G01D 5/24
USPC .......................................................... 30/138
See application file for complete search history.

(56) References Cited

U.S. PATENT DOCUMENTS

| 3,888,004 A * | 6/1975 | Coleman ................. B26B 7/005 |
| | | D24/146 |
| 2015/0094836 A1* | 4/2015 | Rivers .................... B26D 5/005 |
| | | 700/160 |
| 2016/0342142 A1* | 11/2016 | Boeck ................... B24B 23/028 |
| 2019/0201037 A1* | 7/2019 | Houser ............. A61B 18/1233 |
| 2022/0228888 A1* | 7/2022 | Goldman ................. G01D 5/24 |

* cited by examiner

*Primary Examiner* — Omar Flores Sanchez
(74) *Attorney, Agent, or Firm* — Perkins Coie LLP

(57) ABSTRACT

An electronic knife assembly and associated systems and methods are disclosed herein. In some embodiments, the knife includes a blade and a handle operably couplable to the blade. The handle can include an oscillator operably coupled to the blade, at least one sensor configured to obtain one or more measurements, and a controller operably coupled to the oscillator and the least one sensor. The measurements from the sensor can include a spatial position of the electronic knife, a spatial orientation of the electronic knife, a mass of a user's hand, a grip of the user's hand, and/or a resistance to the oscillation of the blade. The controller can adjust an operating frequency of the oscillator based at least partially on the one or more measurements from the at least one sensor. The handle can also include a wireless power supply.

17 Claims, 16 Drawing Sheets

300

1300

1322a 9.4°

1320a

SHARPENING

11 Strokes Remaining

92%    40.0kHz

1300

1322b 6 strokes

ELECTRONIC KNIFE AND RELATED SYSTEMS AND METHODS

CROSS-REFERENCE TO RELATED APPLICATIONS

This application is a continuation of U.S. patent application Ser. No. 17/362,755, filed on Jun. 29, 2021, which claims priority to U.S. Provisional Patent Application No. 63/045,802, filed on Jun. 29, 2020, the entireties of which are incorporated herein by reference.

TECHNICAL FIELD

The present technology is related to electrical knives and related systems and methods. In particular, the present technology is related to rechargeable electric knives, knife holders, and software.

BACKGROUND

A knife is considered to be a cook's most useful, and precious, tool in the kitchen. Over centuries, knife making has evolved as both an engineering discipline and an art form as knife makers have continued to develop better knives. Modern bladesmiths use specific, often proprietary, recipes for the metal they incorporate into their knives. Their recipes combine elements in very precise ratios to balance the competing priorities of sharpness, flexibility, and durability in the final blade. An ideal knife can hold an extremely sharp edge, is flexible or rigid enough for its intended use, can be resharpened over time, and will withstand corrosion.

The sharpness of a knife determines how cleanly it will cut, as well as how much force is required to push the blade through a material. Sharpness can be treated as a measure of the thickness of the narrowest part of the cutting edge of the blade. As one pushes a blade through a material (e.g., a food), the force transmitted from one's hand through the knife is concentrated down through the cross-sectional area of the blade's cutting edge. The smaller the cross-sectional area, the higher the force per unit area (e.g., PSI). A dull knife with a thicker blade edge will require more force to cut through a material than a sharp knife with an extremely thin blade edge. Unfortunately, knives get dull with use as parts of their cutting edges fold over, compress, or get chipped away. While re-sharpening a knife can restore its cutting power, proper re-sharpening requires a careful technique that can be difficult to learn.

A user's cutting technique also effects the cutting ability provided by the knife. For example, moving the knife longitudinally, either in a single stroke or in a reciprocal or sawing motion, allows the cutting edge of the blade to shear the material of interest using less force than static downward pressure. As the cutting edge of the blade moves longitudinally through the material to be cut, microscopic imperfections along the blade's sharpened edge act as saw teeth to cut the material.

Existing electronic knifes are commonly referred to as electric carving knives or electric fillet knives. Existing electric knives motorize the longitudinal reciprocating movement of the knife blade, thereby allowing the user to cut through a material with less force than would be required by a similar, static blade. However, these devices have considerable drawbacks. For example, existing electric knifes often have limitations in the cuts they can provide, their rate of reciprocation, and the form factor of the blades they are compatible with. Accordingly, further solutions are needed.

Figure 1:
FIG. 1 is an illustration of an electronic knife system in accordance with some embodiments of the present technology.

The drawings have not necessarily been drawn to scale. Similarly, some components and/or operations can be separated into different blocks or combined into a single block for the purpose of discussion of some of the implementations of the present technology. Moreover, while the technology is amenable to various modifications and alternative forms, specific implementations have been shown by way of example in the drawings and are described in detail below. The intention, however, is not to limit the technology to the particular implementations described.

DETAILED DESCRIPTION

Overview

Electric carving knives can be limited by the scale of the reciprocation of the blade (e.g., the longitudinal travel distance of the blade during the automated cutting motion). Electric carving knifes commonly have a stroke scale between about 3 millimeters (mm) and about 8 mm in length. Due to the relatively large scale of the stroke along a longitudinal axis, the surface of the material being cut (also referred to as "the subject material" herein) is both sheared by the knife blade and scratched by the microscopic imperfections in the blade. That is, while the microscopic imperfections in the blade can help shear the subject material during the longitudinal motion, they can also damage the subject material during repetitive longitudinal motions. For example, when using an electric knife to separate the skin from the flesh of a fish fillet, the relatively large, reciprocating strokes can result in a frayed microstructure in the flesh. Although the frayed microstructure may not be visible, the additional surface area increases the rate of oxidation of the fillet and negatively impacts the texture of the fish when eaten. Accordingly, for example, sushi chefs (the most discerning culinary knife users) cut fish with the minimum number of strokes using very sharp blades and may avoid the large-scale reciprocating action of an electric knife altogether.

In addition, electric knives often reciprocate relatively slowly, limiting the rate at which they can be pushed through the subject material. For example, electric knives typically oscillate at frequencies between about 10 Hz and 120 Hz. As a result, when the subject material is relatively dense and/or tough (e.g., meats and breads), the user must slow down the speed of their cuts through the subject material to give the blade time to reciprocate. In practice, the result is that using the electric knives can be slower than using a traditional, static blade knife for certain subject materials.

Another limitation of electric knives is the form factor of the blades they can be integrated with. That is, while static knife blades can be constructed from highly engineered materials with specialized form factors (e.g., shape, density, weight, flexibility, and the like), electric knives can be compatible with a limited type of blades. For example, because the energy required to move the blade along the reciprocating stroke is proportional to the mass of the blade, existing electric knife designs are ill-suited for blades made of denser materials and wider blades, such as those associated with many traditional knife shapes (e.g., chef's knives, santokus, cleavers, and the like). Further, to avoid feedback from the oscillations of the blade, a typical electric knife includes a relatively rigid blade.

To address these and other shortcomings, an electronic knife configured to provide cutting assistance using small-scale, energetic vibrations of the knife blade, and related systems and methods, are disclosed herein. The electronic knife can be used cordlessly for all tasks associated with traditional knives. One or more actuators (e.g., transducers) can be coupled to or embedded in the handle of the electronic knife, and the actuators can generate an oscillating movement of the cutting edge of the knife blade to increase cutting power. This can reduce the amount of force needed to cut through subject material. Additionally, an oscillating blade can limit or prevent food from sticking to the blade face compared to a non-oscillating blade. As a result, for example, the electronic knife can produce cleaner cuts through sticky foods, such as dairy products or baked goods.

The handle of the electronic knife can also include electronics to power the actuators, sense (e.g., via optical, electrical, gyroscopic, mechanical, and/or other suitable sensors) operating conditions for the electronic knife, process data, connect (e.g., wirelessly communicate with) with external devices to share information, and/or allow for monitoring and recharging a power source (e.g., one or more batteries). In some embodiments, the electronic knife can also provide information to the user in the form of haptic feedback, lights, sound, and/or an embedded electronic display.

In some embodiments, the electronic knife includes a memory and a programmable processor (e.g., within a microcontroller). The programmable processor can include circuitry configured to execute instructions to cause the programmable processor to perform features of the technology, such as commanding a motion device (e.g., actuator, vibrator, micromotion element, etc.), sending (e.g., transmitting) data (e.g., battery information, usage data, cutting data, sharpening data, recommendations, etc.), or other functions. For example, the electronic knife can cause a notification to be sent to the user indicating any of the following conditions: that the knife should be sharpened based on, for example, usage history, cutting performance, a stored schedule, and/or the like; that the user should modify their grip pressure to minimize the vibrational energy absorbed by the user's hand; recommendations to change the cutting program or center frequency to prevent binding against tough foods, reducing tearing, etc.; that the battery needs to be recharged or is fully charged; that the electronic knife requires calibration of accelerometer and/or magnetometer settings; that a malfunction or error state is detected by the knife's internal circuitry; that the electronic knife is available for pairing (via a local network wireless connection, a wide network wireless connection, etc.) with a portable electronic device (e.g., mobile device, smartphone, computer, etc.) or other electronic device; and other notifications related to the setup, usage, and care of the electronic knife. The electronic knife can include one or more input devices (e.g., buttons, ring selectors, screen, slider, etc.) used to select cutting settings, operation parameters, battery usage settings, etc. During sharpening, the knife can analyze parameters (e.g., applied pressure, knife blade orientation, etc.) to output sharpening recommendations, data to an electronic knife sharpener which uses the data to control the knife sharpening process, etc. In some embodiments, the electronic knife is a rechargeable electric culinary knife, including an ultrasonic knife.

In some embodiments, the handheld electric knife (also referred to as "the knife assembly" a blade and a handle (or "handle assembly") operatively coupled to the blade. The handle can include an autotuning actuator assembly configured to oscillate the blade relative to the handle at a frequency selected based on a resonance frequency of at least one of the electric knife or the blade and obtain one or more measurements during oscillation of the blade, wherein the autotuning actuator assembly is programmed to adjust the frequency based on the obtained one or more measurements.

In some embodiments, the handle can include an oscillator operably coupled to the blade, at least one sensor configured to obtain one or more measurements, and a controller operably coupled to the oscillator and the least one sensor. The measurements from the sensor can include a spatial position of the electronic knife, a spatial orientation of the electronic knife, a mass of a user's hand, a grip of the user's hand, and/or a resistance to the oscillation of the blade. The controller can adjust an operating frequency of the oscillator based at least partially on the one or more measurements from the at least one sensor. The handle can also include a wireless power supply. In some embodiments, the electronic knife includes a plurality of oscillators. In some such embodiments, each of the oscillators is oriented in an independent direction. In some embodiments, one or more oscillators are arranged in parallel directions.

In some embodiments, the controller is configured to determine a resonant frequency for the oscillation of the blade based on measurements from the least one sensor in the knife assembly. The resonant frequency can be affected by a mass of the user's hand, the user's grip, and/or an object being cut by the blade. Once determined, the controller can adjust the speed of the oscillator to match the resonant frequency. In some embodiments, the controller is programmed to determine a plurality of frequencies, including one or more resonant frequencies of the blade, one or more resonant frequencies of the entire electronic knife, one or more frequencies for a target mode shape of blade, etc.

The handle of the electronic knife can also include one or more feedback components, such as a haptic feedback mechanism, visual feedback mechanism (e.g., indicator lights and/or an electronic screen or digital display), and an audible feedback component (e.g., speakers). The feedback component can indicate an angle of the blade with respect to a reference axis (e.g., vertical axis, horizontal axis, etc.), can indicate the orientation of blade (e.g., orientation with respect to a sharpening stone, reference plane, etc.), can provide instructions to a user on how to sharpen the blade, and/or provide instructions to a user on how to appropriately cut an object using the electronic knife. In some embodiments, the handle of the electronic knife also includes a communication component configured to wirelessly communicate with a remote electronic device. For example, the controller can download, through the communications component, one or more updates from the remote electronic device.

In some embodiments, the power supply in the handle includes a secondary cell that can be wirelessly recharged. For example, the handle can include one or more receiving coils electrically coupled to the power supply that are configured to generate an electric current in response to a magnetic field on the receiving coil.

For ease of reference, the electric knife assembly and associated systems are sometimes described herein with reference to top and bottom, upper and lower, upwards and downwards, and/or horizontal plane, x-y plane, vertical, or z-direction relative to the spatial orientation of the embodiments shown in the figures. It is to be understood, however, that the electric knife assembly and associated systems can be moved to, and used in, different spatial orientations without changing the structure and/or function of the disclosed embodiments of the present technology.

Further, although primarily discussed herein as in the context of kitchen cutlery, one of skill in the art will understand that the scope of the invention is not so limited. For example, the methods discussed herein can also be used to adjust the operation of other electronic cutting systems. Accordingly, the scope of the invention is not confined to any subset of embodiments, and is confined only by the limitations set out in the appended claims.

Representative Electronic Knife Systems

FIG. 1 illustrates an electronic knife system 100 in accordance with some embodiments of the present technology. In the illustrated embodiment, the electronic knife system 100 includes an electronic knife assembly 110 (also referred to herein as "the electronic knife" or "the smart knife" herein) and a remote electronic device 120 (also referred to as "the portable electronic device" herein). The electronic knife 110 can be manipulated by a user 10 to perform various tasks, such as cutting, dicing, slicing, chopping, and/or otherwise processing (referred to collectively as "cutting" herein) a subject material (e.g., cooked, raw, and cured meat and plant material, breads, cheeses, pastries, and/or any other suitable materials); sharpening a blade on the electronic knife 110; and various other suitable tasks. Meanwhile, the remote electronic device 120 can provide visual feedback, instructions, statistics and the like to the user 10 to improve their use of the electronic knife 110. The remote electronic device 120 can also be used to control knife operation by, for example, selecting a cutting mode (e.g., a mode for cutting red meat, a mode for cutting fish, a mode for cutting pastries, a mode for cutting bread, a mode for cutting plant material, etc.), a user profile (e.g., user settings/preferences, weight of the user's hand, etc.), operating parameters, etc. In some embodiments, the electronic knife 110 can be a cordless, handheld, culinary knife. The knife blade can be constructed from metal (e.g., an alloy steel) that is sharpened at a cutting edge. As discussed in more detail below, the handle assembly can include a housing that encloses various electronic and/or mechanical components. The housing of the handle assembly can be constructed from any durable, natural, and/or engineered material. In some embodiments, for example, the housing of the handle assembly is constructed primarily from wood that has been milled to enclose the internal components. In various embodiments, the electronic knife 110 can be a chef's knife, a paring knife, a boning knife, slicers, a santoku knife, a bread knife, cleavers, and/or other specialty blade shapes and handheld knifes. Alternately, the electronic knife 110 may not conform to an established category of blade shape. For example, as illustrated in FIGS. 4A-4D, the electronic knife 110 can include a blade with a rectangular side profile. The custom shapes can be advantageous for maximizing a resonance amplitude of the blade and/or simplifying resonance or mode shape calculations (discussed in more detail below) for the electronic knife 110.

In various embodiments, the blade of the electronic knife 110 can be made from one or more metals, ceramics, plastics, woods, other natural materials, and/or other suitable materials. The material of the blade of the electronic knife 110 can be selected based on mass, hardness, wear characteristics, mechanical properties, chemical reactivity (corrosion), and/or an intended use. For example, ceramic knives can be sharpened to an extremely fine, durable cutting edge; plastic knives are dull enough to reduce the risk of accidental injury while sharp enough to cut through some vegetables and leafy greens; and wood knives can be used for cutting and serving soft cheeses. Further, the knife can have a blade made of alloy metals, such as steel or titanium. In some embodiments, different alloys are used to create different characteristics in one or more performance factors for the electronic knife 110, such as edge-holding ability, durability, flexibility, resonance characteristics, corrosion resistance, aesthetic design, and/or various other suitable factors.

In addition to the culinary applications discussed above, in some embodiments, the electronic knife system 100 can also be used for hunting, survival, and wilderness scenarios. The blade of the electronic knife 110 can be formed with a different steel alloy for wilderness applications than for culinary applications. In some embodiments, the alloys used in wilderness applications can be configured to withstand higher forces and increased exposure to corrosive elements.

For example, in some embodiments, the electronic knife 110 is used for skinning and butchering of game, as well as various wilderness tasks like sawing through branches and cutting rope. Accordingly, the blade of the electronic knife 110 can be configured to endure increased stress forces and moisture while sacrificing some flexibility and/or maneuverability.

Further, sharp, handheld blades are important tools for woodworking and fine joinery. The electronic knife system 100 can include chisels and/or handheld planes configured in accordance with the present technology, enabling woodworkers to remove material using less physical force. For example, the blade of the electronic knife 110 can be swappable (or replaced) by a chisel blade that can be actuated in the same manner discussed below. In another example, the blade of the electronic knife 110 can be swappable (or replaced) by a saw blade that can be actuated in the same manner discussed below.

Additionally, the electronic knife system 100 can include features suitable for crafting activities, such as cutting paper, cloth, rubber, felt, foam, plastics, and other materials. For example, common tools used in crafting include mat knives and scalpel-style knives (e.g., an X-Acto® knife) with interchangeable blades. Accordingly, in some embodiments, the handle assembly of the electronic knife 110 is adapted to fit the form factor of a scalpel, mat knife, pen knife, or other suitable crafting element.

Figure 2:
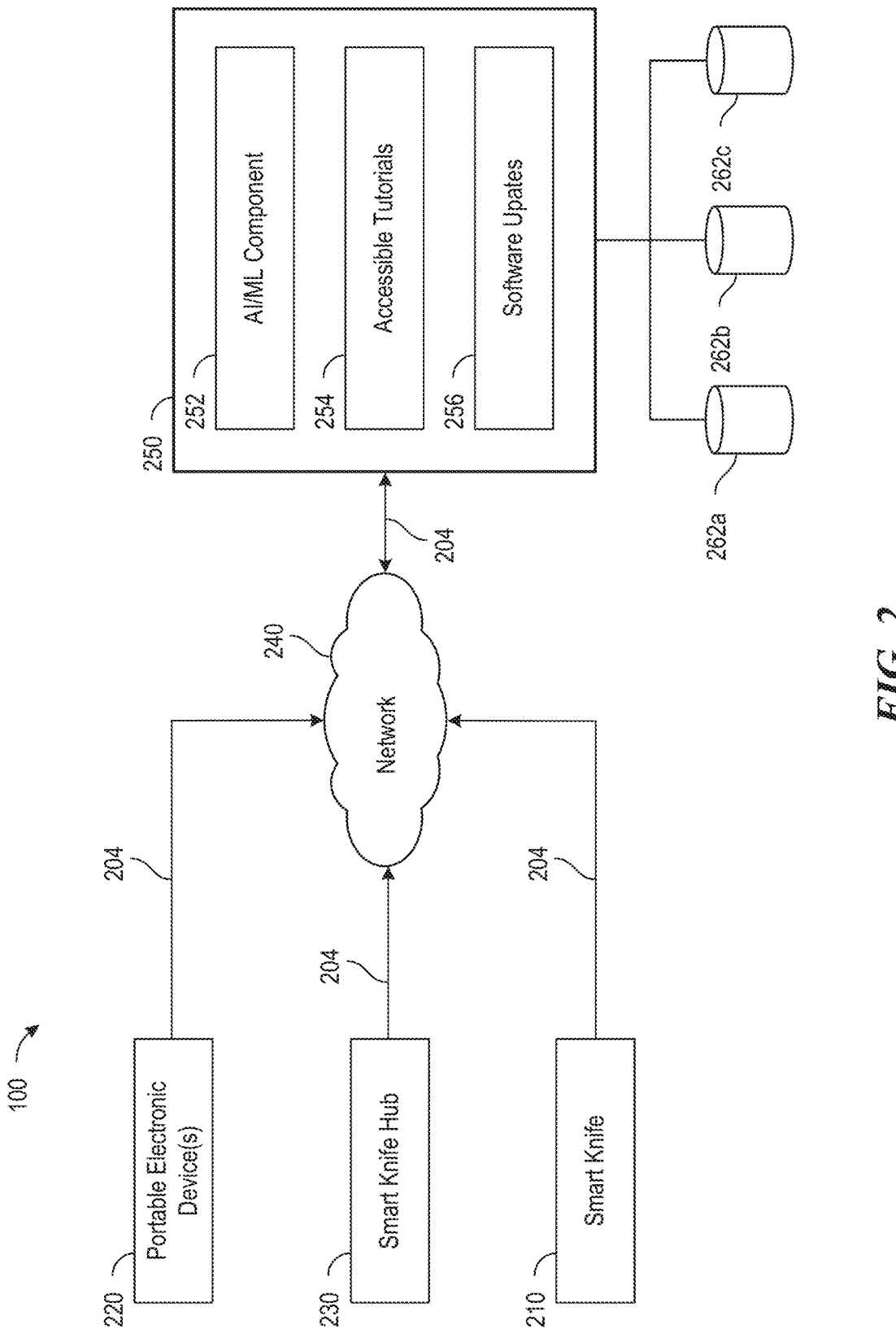
FIG. 2 is a network connection diagram of an electronic knife system of the type illustrated in FIG. 1 in accordance with some embodiments of the present technology.

FIG. 2 is a network connection diagram of an electronic knife system 100 of the type of FIG. 1 in accordance with some embodiments of the present technology. As illustrated in FIG. 2, the electronic knife system 100 can include a smart knife 210, one or more portable electronic devices 220, and a smart knife hub 230. Each of the smart knife 210, the portable electronic device(s) 220, and the smart knife hub 230 has a communication channel 204 with a network 240. In turn, the network 240 has a communication channel 204 with a server 250. The server 250 can include one or more modules relevant to the operation and maintenance of the electronic knife system 100. For example, in the illustrated embodiment, the server includes a module 252 with an artificial intelligence and/or machine learning ("AI/ML") component; a module 254 with accessible tutorials for using the electronic knife system 100, cleaning the smart knife 210, sharpening the smart knife 210, and/or various other functions; and a module 256 for pushing software updates (e.g., firmware updates, calibration updates, etc.) or new software programs to any of the components of the electronic knife system 100. In addition, the server 250 can include one or more databases 262 (three databases 262a-262c shown in FIG. 2) storing information related to the system. For example, one of the database(s) 262 can store metrics on the operation of the smart knife 210 that can be mined by the AI/ML component of the module 252 to improve the operation of the smart knife 210 (e.g., to increase the time spent operating at or near a resonant frequency for the smart knife 210).

The electronic knife system 100 can be configured to collect measurements from one or more sensors in the smart knife 210, the portable electronic device(s) 220, and/or the smart knife hub 230. For example, the sensors can measure various operation parameters of the smart knife 210 such as total time operated, total time cutting, orientation of the smart knife 210, oscillation frequency of a blade of the smart knife 210, density of materials processed, feedback forces from the blade, mass or weight of a user's hand, a user's grip, deformation of the blade, mode shape of blade, and/or various other suitable parameters. Similarly, the sensors can measure operation statistics for the portable electronic device(s) 220 (e.g., total time watching tutorials, type of tutorials watched, feedback on tutorials) and/or the smart knife hub 230 (e.g., time spent charging the smart knife 210).

The electronic knife system 100 can then be configured to analyze the measurements from the sensors. For example, the AI/ML component of the module 252 and/or a processor on the smart knife 210 can study the operation parameters of the smart knife 210 to predict when the blade will need to be sharpened, adjust the oscillation frequency of the blade based on one or more operation parameters, and the like. In another example, the AI/ML component of the module 252 can study the operation statistics of the portable electronic device(s) 220 to recommend additional tutorials to the user based on their viewing history.

The module 252 can include machine learning models, such as neural networks, trained to produce types of results. A neural network can be trained by obtaining a quantity of "training items," where each training item includes input similar to input the model will receive when in use and a corresponding scored result. The input from each training item can be supplied to the model to produce a result. The result can be compared to the scored result. Model parameters can then be updated, based on how similar the model result is to the scored result and/or whether the score is positive or negative. For example, machine learning models can be trained with reference knife sharpening data, cutting data (e.g., data collected when cutting different foodstuff, such as fish, beef, bread, pastries, etc.), etc. In some embodiments, a model can be trained using sets of sharpening data and corresponding scores for the result of that sharpening process. Machine learning models can be trained to produce various results such as: maximize reduction of required blade force to cut, maximize efficiency of conversion from electrical energy to mechanical oscillation, maximize blade sharpness, increase accuracy of maintaining vibratory response, increase cutting speed, reduce micro tearing of food, enhance knife feel/balance, etc. The module 252 programmed to adjust the actuation frequency to keep elastic deformation of the blade relative to a midplane of the blade below a target level, thereby maintain a desire mode shape.

Figure 3:
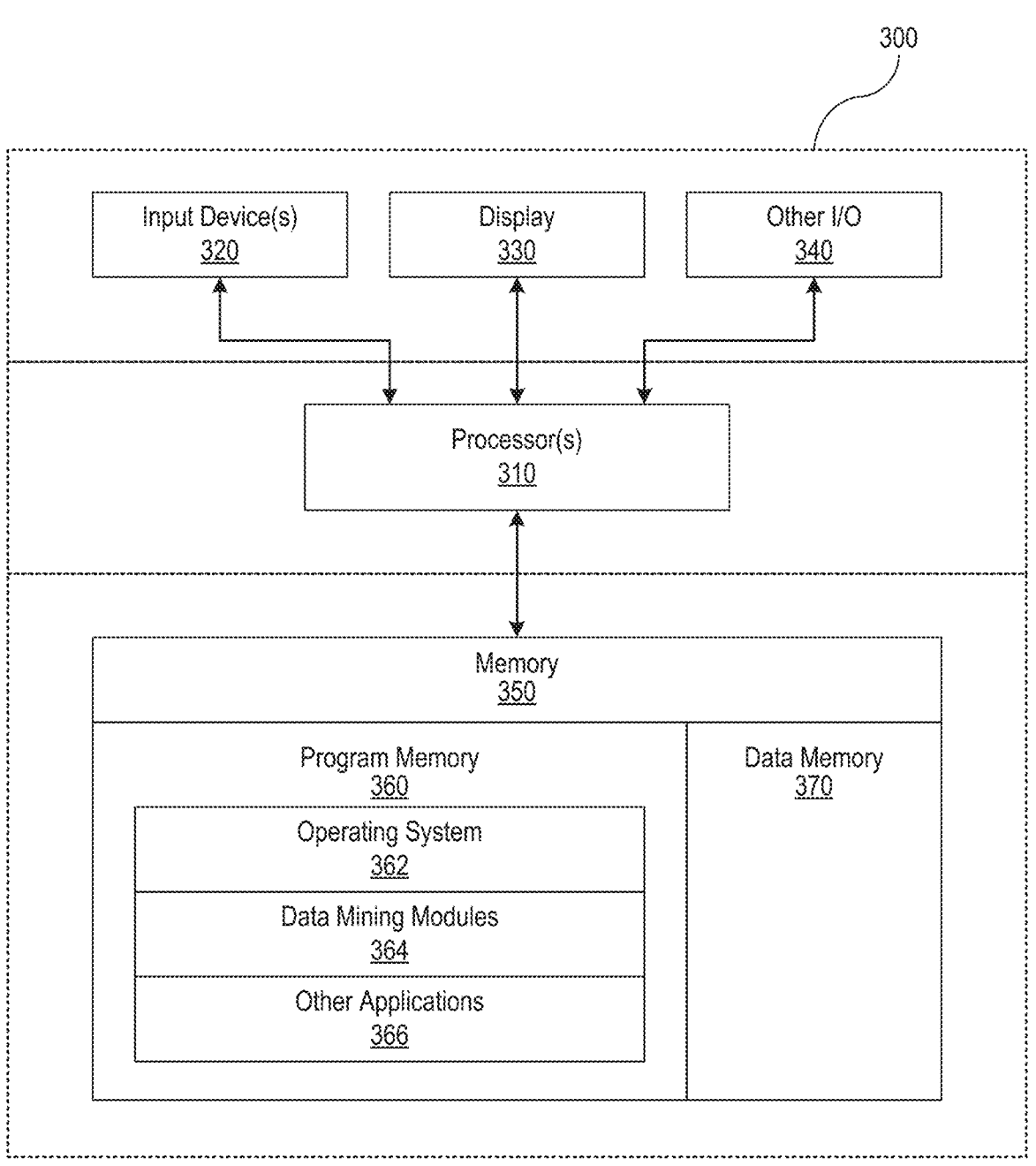
FIG. 3 is a block diagram of a computing device suitable for use in connection with the electronic knife system of FIG. 2 in accordance with some embodiments of the present technology.

FIG. 3 illustrates a computing device 300 suitable for use in connection with the electronic knife system 100 of FIG. 2 according to some embodiments of the present technology. The computing device 300 can be incorporated in various components of the electronic knife system 100 of FIG. 2, such as the smart knife 210 as shown in FIG. 2, the portable electronic device(s) 220, the smart knife hub 230, and/or the server 250. The computing device 300 can be incorporate into a handle assembly, such as the handle assemblies 412, 512, 612 disclosed below.

With continued reference to FIG. 3, the computing device 300 includes one or more processors 310 (e.g., CPU(s), GPU(s), HPU(s), etc.). The processor(s) 310 can be a single processing unit or multiple processing units in a device or distributed across multiple devices. The processor(s) 310 can be coupled to other hardware devices, for example, with the use of a bus, such as a PCI bus or SCSI bus. The processor(s) 310 can be configured to execute one more computer-readable program instructions, such as program instructions to perform of any of the methods described herein.

The computing device 300 can include one or more input devices 320 that provide input to the processor(s) 310, e.g., to notify it of actions from a user of the computing device 300. The actions can be mediated by a hardware controller that interprets the signals received from the input device and communicates the information to the processor(s) 310 using a communication protocol. Input device(s) 320 can include, for example, sensors (e.g., capacitive sensors, touch sensors, motion sensors, contact sensors, voice sensors, etc.), a mouse, a keyboard, a touchscreen, an infrared sensor, a touchpad, a wearable input device, a camera- or image-based input device, a microphone, or user input devices. The input device(s) 320 can also include dampening components, actuators, and components that can output signals indicative of operation of the knife. The output signals can be used in feedback loops or other control routines.

The computing device 300 can include a display 330 used to display various types of output, such as text, models, virtual culinary tasks, virtual examples of maintenance on the electronic knife system 100, graphics, and/or images (e.g., images with visual instructions for a culinary task). In some embodiments, the display 330 provides graphical and textual visual feedback to a user. The processor(s) 310 can communicate with the display 330 via a hardware controller for devices. In some embodiments, the display 330 includes the input device(s) 320 as part of the display 330, such as when the input device(s) 320 include a touchscreen or is equipped with an eye direction monitoring system. In alternative embodiments, the display 330 is separate from the input device(s) 320. Examples of display devices include an LCD display screen, an LED display screen, a projected, holographic, or augmented reality display (e.g., a heads-up display device or a head-mounted device), and so on.

Optionally, other I/O devices 340 can also be coupled to the processor(s) 310, such as a network card, video card, audio card, USB, firewire or other external device, camera, printer, speakers, CD-ROM drive, DVD drive, disk drive, or Blu-Ray device. Other I/O devices 340 can also include input ports for information from directly connected culinary equipment such as a scale, the smart knife hub 230, a knife sharpening apparatus, an imaging system, etc. Other I/O devices 340 can further include input ports for receiving data from various types of machines, various components of the electronic knife system 100, and/or from other sources (e.g., across a network, or from an external database). The I/O devices 340 can also include haptic feedback mechanisms, audible feedback components, visual feedback mechanism, or the like. For example, the I/O devices 340 can output feedback based on use of the knife. In some embodiments, the I/O devices 340 can output audible instructions or audible cues to notify the user of usage data (e.g., improper usage, proper usage, etc.), technique feedback (e.g., improper technique, proper technique, etc.), alerts, etc. in real-time. The knife can execute training programs to guide a user for different cutting techniques.

In some embodiments, the computing device 300 also includes a communication device (not shown) capable of communicating wirelessly or wire-based with a network node. The communication device can communicate with another device or a server through a network using, for example, TCP/IP protocols. The computing device 300 can utilize the communication device to distribute operations across multiple network devices, including multiple smart knife hubs 230 (FIG. 2), multiple portable electronic devices 220, etc.

Figures 4A, 4B, 4C, 4D:
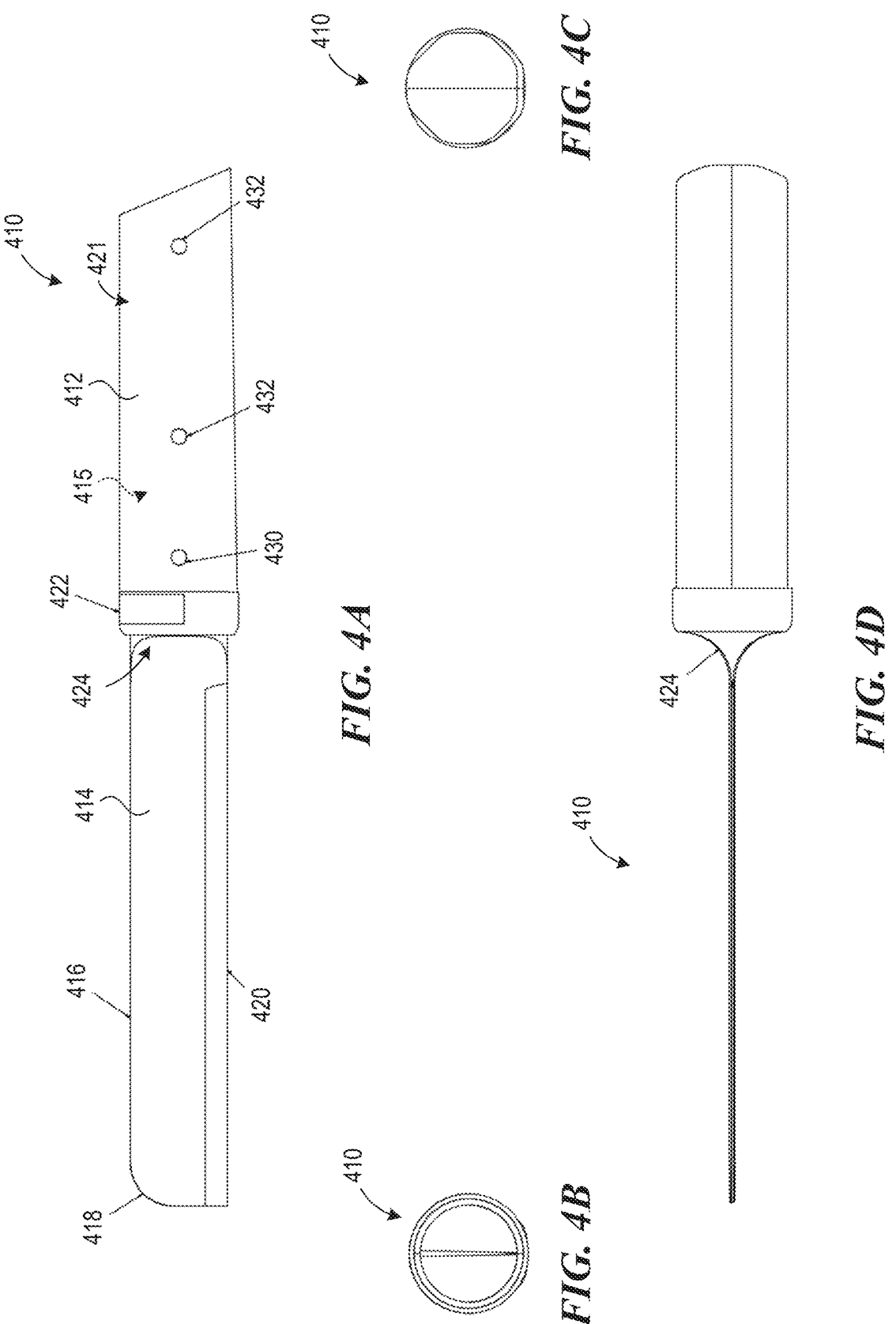
FIGS. 4A-4D are a side, front, rear, and bottom views of an electronic knife in accordance with some embodiments of the present technology.

The computing device 300 can include memory 350, which can be in a single device or distributed across multiple devices. Memory 350 includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. In some embodiments, the memory 350 is a non-transitory computer-readable storage medium that stores, for example, programs, software, data, or the like. In some embodiments, memory 350 can include program memory 360 that stores programs and software, such as an operating system 362, one or more data mining modules 364 (e.g., AI/ML components, neural networks, and the like), and other application programs 366. Memory 350 can also include data memory 370 that can include, e.g., reference data, calibration data, settings, user options or preferences, etc., which can be provided to the program memory 360 or any other element of the computing device 300. Representative Electronic Knives FIGS. 4A-4D are a side view, front view, rear view, and bottom view, respectively, of an electronic knife 410 in accordance with some embodiments of the present technology. As illustrated in FIG. 4A, the electronic knife 410 includes a handle assembly 412 and a blade 414. The blade 414 includes an upper edge 416, a distal tip 418, a lower edge 420, and a mounting region 424. The handle assembly 412 has a housing 421 that contains one or more electrical components of the electronic knife 410. For example, as illustrated, the housing 421 includes a feedback component 422 (e.g., a ring of status indication lights, a ring LCD, and/or any other suitable component), a touch sensor 430 (e.g., a capacitive sensor), and fasteners or rivets 432. As described in more detail below, the housing 421 also contains electronic components 415 for the electronic knife 410 that can cause the blade 414 to reciprocate, oscillate, and/or vibrate (referred to collectively herein as "oscillate" and/or "oscillation") in one or more directions.

In the illustrated embodiment, the housing 421 of the handle assembly 412 is secured together by the couplers in the form of rivets 432. The rivets 432 can be made from a steel alloy and designed to mimic traditional knife making techniques for securing a traditional handle assembly to a blade. In some embodiments, the rivets 432 also preload a compression force against actuating components within the handle assembly 412. For some actuating components, static preloading force improves the power output of the actuators, thereby improving operation of the electronic knife 410. In some embodiments, each exposed portion of a rivet can act as a touch sensor 430 that is flush with the housing 421 of the handle assembly 412. Each touch sensor 430 can be used as an electrical contact for the user to interact with the electrical components of the electronic knife 410. In some embodiments, one or more rivets 432 are used as electrical contacts to recharge a power supply within the electronic knife 410. In various embodiments, the handle assembly 412 is additionally, or alternatively, secured together by screws, bolts, glue, snap-fit, or other suitable method of component assembly. In some embodiments, the housing 421 is a single component with an opening into which the electronic components 415 are placed.

In the illustrated embodiment, the upper edge 416 of the blade 414 is dull, while the lower edge 420 is mechanically sharpened by grinding or compressing material at the cutting edge (as in traditional sharpening) into an angle with respect to a face of the blade 414. The cutting performance of the blade 414 is improved compared to a traditional knife by the oscillations of the blade 414. For example, the downward force required to push the lower edge 420 through a subject material (e.g., a piece of food) is reduced by the high frequency mechanical oscillation of the blade 414 driven by the handle assembly 412. In some embodiments, the downward force is further reduced by oscillation at a resonant frequency for the blade 414. Further, as discussed above, the high frequency oscillations can improve the overall performance of the electronic knife 410 (e.g., by avoiding fraying the subject material and/or expediting the operation of the electronic knife 410).

In various embodiments, the downward force is reduced by a factor of from about 25% to about 75%. For example, an uncooked squash can require a total downward force of about 30 pounds (lbs.) to push a traditional knife blade through the material, while the electronic knife 410 can require between about 7.5 lbs. and about 22.5 lbs., depending on the operating parameters of the electronic knife 410. Additionally, the amount of sawing motion necessary to press the blade 414 through the subject material is reduced because the mechanical oscillation of the blade 414 performs the same effective sawing motion at a reduced amplitude of motion. For example, in some embodiments, the movement amplitude of the oscillations is between about 1 micron (μm) and about 5 μm, compared to several inches when a traditional knife is moved by hand.

Table 1 below contains various examples of the reduction in downward force achieved by the electronic knife 410 for a selection of subject materials. Samples of each subject material were mounted in a texture analyzer, which can measure the amount of force applied against the subject material as a blade is pushed through a sample subject material along a single axis of motion. An electronic knife 410 with an oscillating blade 414 was affixed to a moving arm of the texture analyzer with the edge of the blade parallel to the axis of motion, to simulate cutting through the sample subject material without any hand movement. As the blade is pushed through the sample subject material by the moving arm, the texture analyzer records the force exerted against the sample subject material, as well as the position of the blade.

sawing) motion from a user's hand will compound with the oscillations, resulting in additional reductions in the overall force required to cut through the relevant subject material.

In some embodiments, the mechanical oscillation reduces the ability of cut pieces of the subject material to adhere to the blade 414 of the electronic knife 410. As a result, multiple consecutive cuts moving across the length of the subject material can produce a cleaner cut. For example, because the cut surfaces do not adhere to the blade 414 of the electronic knife 410, the cut surfaces are not pulled in the direction of the cutting motion and therefore are not moved out of place.

In addition to improving the cutting performance of the blade 414, the electronic knife 410 can also provide additional benefits, such as aiding in maintaining (e.g., cleaning, sharpening, and the like) the blade 414, performing various other culinary tasks (e.g., atomizing a liquid), and instructing the user on making cuts.

For example, in some embodiments, the mechanical oscillation reduces the number of strokes against a sharpening material (ex. a sharpening stone) that are required to sharpen the lower edge 420 of the blade 414. For example, the high-frequency mechanical oscillations can compound with macro-scale sharpening motions, resulting in less macro-scale sharpening motions necessary to resharpen the lower edge 420 of the blade 414. Additionally, as discussed in more detail below, the electronic components 415 in the handle assembly 412 can include components that provide audible, visual, and/or haptic feedback on the user's technique while resharpening the lower edge 420 of the blade 414. For example, the feedback component 422 can provide a visual indication of an actual angle of the blade 414 during resharpening, an ideal angle for the blade 414 during resharpening, and/or a divergence of the actual angle from the ideal angle.

The feedback from the handle assembly 412 can result in improvements in the resharpening of the lower edge 420 of the blade 414 without requiring the user to develop special skills. In turn, the improvements can increase the mechani-

TABLE 1

| | | Subject Material | | | | | |
|---|---|---|---|---|---|---|---|
| | Ultrasonic Generator | Sandwich Bread | Cream Puff | Tomato | Carrot | Apple | Chicken Sausage |
| Peak | Off | 134.5 | 124.5 | 1444.8 | 1468.2 | 1189.9 | 188.5 |
| Downward Force | On | 54.4 | 42.5 | 872.4 | 836.2 | 660.8 | 124.4 |
| % Difference | | 40.5% | 34.1% | 60.4% | 57.0% | 55.5% | 66.0% |
| Total | Off | 157991 | 301771 | 2753549 | 1268232 | 3763314 | 457613 |
| Downward Force | On | 66765 | 91968 | 1783242 | 799330 | 2129743 | 321093 |
| % Difference | | 42% | 30% | 65% | 63% | 57% | 70% |

The Peak Downward Force of Table 1 corresponds to the maximum momentary force exerted as the electronic knife 410 cut through the sample subject material. The Total Downward Force of Table 1 corresponds to the sum of the force exerted across the entire travel through the sample (e.g., the area under a curve of the force as the electronic knife 410 cuts the sample subject material). Table 1 does not contain units corresponding to the values because units are specific to the texture analyzer, while the scale of the reduction is expected to be relatively constant across experimental setups. As shown in Table 1, the oscillations of the electronic knife 410 can alone reduce the total force required to cut the sample subject material by between about 30% and about 70%. It is expected that a macro-scale slicing (or cal sharpness of the lower edge 420, extend the number of resharpenings the blade 414 can withstand over its lifetime, and/or reduce the likelihood of edge defects such as chips, indentations, or folds in the lower edge 420. Accordingly, the feedback from the handle assembly 412 can simultaneously increase the accessibility and the convenience of properly maintaining the electronic knife 410.

In some embodiments, the distal tip 418 of the blade 414 is used to atomize liquid droplets into a fine mist. In such embodiments, high-frequency oscillations of the blade 414 cause water and/or other liquid molecules to break apart into very fine droplets that are propelled away from the distal tip 418 as it oscillates. The atomizing function can be advantageous for dispersing liquid particles from a selected subject material. For example, the atomizing function can be used to express essential oils or other flavorful liquid from citrus into a beverage and/or to season another food. The atomizing function can also be advantageous for cleaning the blade 414 after cutting a subject material because liquid molecules and contaminants are propelled away from the blade 414.

In some embodiments, the feedback component 422 on the electronic knife 410 can help instruct a user on where to make cuts, an angle for the cut, how deep to cut, a technique for the cut, and the like. As a result, the feedback component 422 can help the user ensure precisely oriented, aligned, or spaced cuts.

For example, the user may want to slice a tomato into a set of flat slices of even thickness. This requires holding the knife at a consistent angle of about 90-degrees tangent to the cutting board, and to moving the blade 414 a consistent distance from the cut face of the previous slice. Accordingly, the user can toggle the electronic knife 410 into an assisted positioning mode (e.g., by touching a button on the electronic knife 410, making a selection in a companion app, or the like). The electronic knife 410 can then provide any combination of visual, auditory, and haptic feedback to guide the user to hold the electronic knife 410 at exactly the desired angle to the cutting board and/or an exact distance from the previous slice.

In another example, the user may want to cut a round cake into 12 equal portions. Accordingly, the user can toggle the electronic knife 410 into the assisted positioning mode and select a starting slice position. Using one or more embedded sensors (e.g., orientation sensors, position sensors, optical sensors, imaging sensors, etc.) and visual, auditory, and/or haptic feedback, the electronic knife 410 can guide the user to the correct blade orientation to make subsequent slices, such that she produces 12 equally sized portions from the cake. In some embodiments, the electronic knife 410 uses accelerometer information to determine when a cut is complete, for example by detecting that the electronic knife 410 has stopped against a hard surface below and/or by detecting a change in movement direction from downward to upward.

In various embodiments, the blade 414 of the electronic knife 410 can have varying form factors. For example, as discussed above, the blade 414 can have the profile of a chef's knife, a paring knife, a boning knife, slicers, a santoku knife, a bread knife, cleavers, the illustrated rectangular profile, and/or any other suitable profile. However, each different blade profile can have a different resonant frequency. Further, in some embodiments, the blade 414 can be interchangeable with one or more additional blades, increasing the adaptability and/or flexibility of the electronic knife 410. Accordingly, as discussed in more detail below, the electronic knife 410 can include one or more features for determining, estimating, and/or retrieving the resonant frequency for the included blade 414. In some embodiments, the electronic knife 410 can include one or more features for determining changes in the resonant frequency for the blade 414 over time (e.g., due to wear and tear, changing operation parameters, and the like).

Figure 5A:
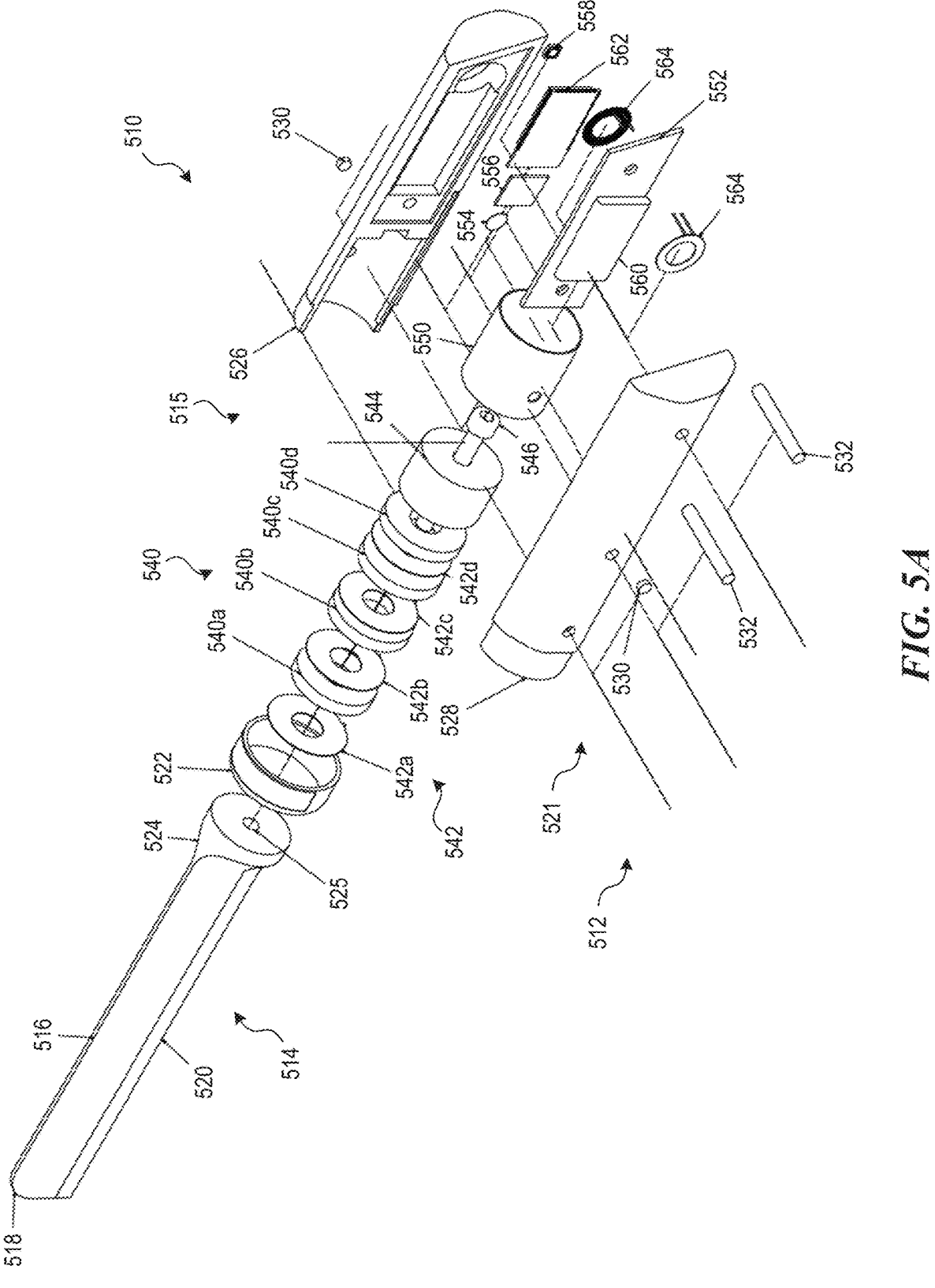
FIGS. 5A and 5B are exploded views of an electronic knife in accordance with some embodiments of the present technology.
Figure 5B:
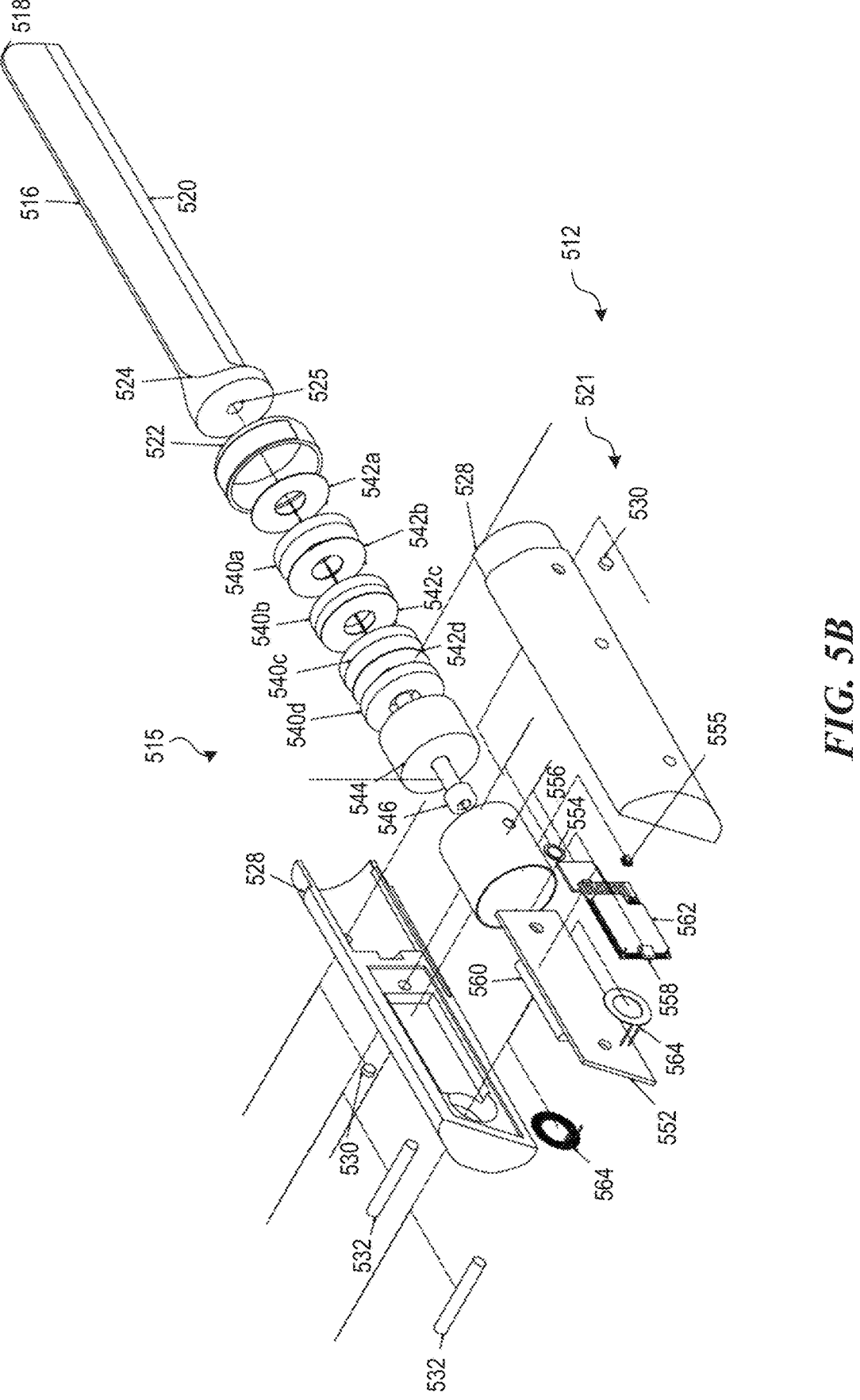

FIGS. 5A and 5B are exploded views of an electronic knife 510 in accordance with some embodiments of the present technology. Like the electronic knife 410 discussed above with respect to FIGS. 4A-4D, the electronic knife 510 includes a handle assembly 512 and a blade 514. The blade 514 includes an upper edge 516, a distal tip 518, a lower edge 520, and mounting region 524. The handle assembly 512 has a housing 521 that includes a first scale 526 and a second scale 528 that are held together and/or connected by a touch sensor 530 (e.g., a capacitive sensor) and rivets 532. The housing 521 can enclose and/or carry the electronic components 515 (also referred to as an "autotuning actuator" herein) of the electronic knife 510 and/or mechanical components related to the electronic components 515. For example, like the electronic knife 410 discussed above with respect to FIGS. 4A-4D, the first and second scales 526, 528 carry a feedback component 522 (e.g., a ring of status indication lights, a ring LCD, and/or any other suitable component) on an external surface of the housing 521.

Additionally, as illustrated in FIGS. 5A and 5B, the housing 521 can enclose one or more actuators 540 (four shown, referred to individually as first-fourth actuators 540a-540d) and one or more drivers 542 (four shown, referred to individually as first-fourth drivers 542a-542d) operably connected to the actuators 540. The actuators 540 are operably coupled to a stack bolt 546 that is threaded into a receiving thread 525 in the mounting region 524 of the blade 514, thereby operably coupling the actuators 540 to the blade 514. As a result, movement of any of the first-fourth actuators 540a-540d causes the blade 514 to move as well. As further illustrated in FIGS. 5A and 5B, a counter mass 544 is attached to the stack bolt 546 opposite the receiving thread 525. In some embodiments, the actuators 540, drivers 542, stack bolt 546, and counter mass 544 act as a bolt-clamped Langevin transducer to drive oscillations of the blade 514. For example, when the drivers 542 apply an input force (e.g., a voltage) to the actuators 540, the actuators 540 generate a proportional force on the stack bolt 546, thereby displacing each end of the stack bolt 546 and moving the blade 514 and the counter mass 544. In some embodiments, the stack bolt 546 is tightened to a specific compression force to preload electronic knife 510, thereby reducing tensile forces within the electronic knife 510. Additionally, or alternatively, one or more of the actuators 540, drivers 542, and counter mass 544 can be secured to the stack bolt 546 (e.g., through a glue, epoxy, or other rigid adhesive) to maximize the energy transfer from the drivers 542 into the blade 514 and counter mass 544. In some embodiments, the counter mass 544 can be increased or decreased by adding or removing mass. For example, the counter mass 544 can include a set of removable weights. A user can increase or decrease the counter mass 544 to decrease or increase, respectively, the natural frequency of electronic knife 510, adjust the balance of the electronic knife 510 (e.g., to compensate for changing the blade 514), and the like.

In some embodiments, each of the first-fourth actuators 540a-540d moves the blade 514 in a different field of motion (e.g., each of the first-fourth actuators 540a-540d provides an independent degree of freedom to the blade 514). For example, the first actuator 540a can move the blade 514 along a first axis parallel to the longitudinal axis of the blade 514; the second actuator 540b can move the blade 514 along a second axis transverse to the longitudinal axis of the blade 514; the third actuator 540c can move the blade 514 along a third axis in a vertical direction; and the fourth actuator 540d can rotate the blade 514 along the first axis. In some embodiments, one or more of the first-fourth actuators 540a-540d move the blade 514 in parallel. For example, the first and second actuators 540a, 540b can each move the blade 514 along the longitudinal axis of the blade 514, thereby allowing for a larger range of motion along the longitudinal axis.

In various embodiments, the actuators 540 can be a transducer (e.g., a piezoelectric or other suitable transducer), a linear resonant actuator, a powered electromagnet, an electromagnetically actuated voice coil, a rotating motor, and/or any other suitable element. Similarly, for example, each of the drivers can be an electrode supplying an alternating current and/or voltage, and/or any other suitable component to drive the motion of the actuators 540. In some embodiments, the mechanical displacement generated by the actuators 540 is transferred by longitudinal pressure waves into the blade 514. The total displacement in the blade 514 is proportional to the displacement of the actuators 540, the stiffness characteristics of the blade material, and the cross-sectional area of the blade 514. Accordingly, in some embodiments, the mounting region 524 includes a continuous curvature loft (e.g., a smoothly tapered cross-sectional area) to transition the forces from the actuators 540 into the cutting portion of the blade 514.

As further illustrated in FIGS. 5A and 5B, the handle assembly 512 can enclose a dampening component 550 coupled to the stack bolt 546 and/or the counter mass 544. The dampening component 550 can reduce the vibrational energy transferred into the housing 521. That is, the dampening component 550 allows the actuators 540 to be tightly mechanically coupled to the blade 514 and loosely mechanically coupled to the housing 521. Further, the dampening component 550 provides sufficient rigidity to transfer cutting forces (e.g., a downward force) applied to the handle assembly 512 by the user's hand into the blade 514. As a result, the dampening component 550 can help reduce the amount the handle assembly 512 is vibrated by the actuators 540, while allowing the user to appropriately manipulate the electronic knife 510. The reduction helps maximize the amount of vibrational energy transmitted into the blade 514 itself and reduces a risk the user's hand slips due to the vibration and/or is fatigued. In various embodiments, the dampening component 550 can include a rubber sleeve, foam pad, semi-elastic adhesive (e.g., silicone glue), and/or any other suitable component. Further, in various embodiments, the dampening component 550 has a type A scale durometer rating between about 50A and about 70A. In some embodiments, the dampening component 550 can include one or more piezoelectric dampers, fluid dampers, semi-active-stiffness dampers, and dampers configured to provide active dampening.

As further illustrated in FIGS. 5A and 5B, the handle assembly 512 can enclose a printed circuit board 552 ("PCB 552") that is sheltered from the stack bolt 546 by the dampening component 550. The PCB 552 can carry one or more controllers 562 (or "microcontrollers 562," one shown), a power supply 560 (e.g., one or more batteries), a power receiver 564 (e.g., a receiving coil for wireless power transfer and/or an input for wire-based power transfer), one or more sensors 558 (one shown), a power amplifier 556, and an internal feedback mechanism 554 (e.g., a speaker such as a piezoelectric buzzer, a voice-coil speaker, or any other device that generates audible feedback; a haptic feedback device, and the like).

The microcontroller 562 can include a CPU; processors; RAM; non-volatile storage memory and program memory; analog-to-digital signal processing circuitry capable of reading voltages from about 0 volts (V) to about 5 V with a precision of at least 8-bits (e.g., 12-, 14-, or 16-bits); general purpose input/output (I/O) communication connections (pins); and/or one or more signal generator circuits capable of generating signals, including waveform signals between about 1 Hz and about 80 kHz where the waveform shape may be sinusoidal, triangular, square, sawtooth, or any other suitable waveform for driving the actuators 540. In various embodiments, the microcontroller 562 can include additional components selected based on desired operation of the electronic knife 510.

For example, the microcontroller 562 can include one or more programmable components that can execute stored instructions to perform any of the functions of the electronic knife 510 disclosed herein. The programmable components can encompass all kinds of apparatuses, devices, and machines for processing data, (e.g., a programmable microprocessor, a computer, a system on a chip, multiple systems on a chip, and/or any combinations therein). The programmable component can include circuitry, special purpose logic circuitry (e.g., a field programmable gate array (FPGA) or an application-specific integrated circuit (ASIC)). The programmable component also can include, in addition to hardware, code that creates an execution environment for the computer program in question, e.g., code that constitutes processor firmware, a protocol stack, a database management system, an operating system, or a combination of one or more of them. Additionally, or alternatively, the programmable component can be configured to be controlled via a remote device (e.g., a user's mobile device, computer, or another network device).

The memory on the microcontroller 562 can be secure memory, standard memory, or a combination of both memory types. In various embodiments, the memory can be flash memory, secure serial EEPROM, secure field programmable gate array, or secure application-specific integrated circuit and can store instructions and computer programs. Computer programs can be written in any form of programming language and can be stored in a portion of a file that holds other programs or data (e.g., one or more scripts stored in a markup language document), in a single file dedicated to the program in question, or in multiple coordinated files (e.g., files that store one or more modules, subprograms, or portions of code). The memory can store various types of data, such as executable instructions, battery information, cutting routines (e.g., routines for cutting subject materials such meat, vegetables, bread, cheesecakes, pastries, and the like), user preferences, usage history, motion programs (e.g., vibration routines, oscillation routines, oscillation resonance tuning routines, and the like), grip data, correlations (e.g., correlations between grip characteristics and operational parameters), and/or other data used to control operation of the electronic knife 510.

The microcontroller 562 can be coupled to the touch sensor 530 to receive inputs from a user. For example, the inputs can include an indication to power on, power off, change oscillation speed, and the like. In some embodiments, the touch sensor 530 is a single capacitance sensor, and the microcontroller 562 is configured to respond to a change in capacitance (due to a user touching the capacitance sensor) and interpret various interactions with the capacitance sensor as inputs. For example, the user can touch the touch sensor 530 a single time to indicate to power on, a second time to indicate to reduce the oscillation speed, and a third time to indicate to power off. In another example, the user can hold the touch sensor 530 to indicate to power on/off and tap the touch sensor 530 to indicate to adjust the oscillation speed (e.g., to toggle between resonant frequencies, to search for a resonant frequency, and the like). Instructions for interpreting the interactions can be stored in the memory on the microcontroller 562 and/or updated periodically.

During operation of the electronic knife 510, the microcontroller 562 produces an input signal using its integral signal generator. The waveform of the input signal is sent to the power amplifier 556, which increases the voltage and current of the input signal, then outputs the boosted signal to the drivers 542. In turn, the drivers 542 input the boosted signal to the actuators 540, which convert the amplified electrical signal into mechanical energy. Further, the actuators 540 transfer the mechanical energy into the blade 514 (through the stack bolt 546), thereby converting the electrical energy into mechanical oscillations of the blade 514. In some embodiments, once the blade 514 begins to oscillate, the electronic knife 510 visually, audibly, and/or haptically informs the user that the blade 514 is actively oscillating through the feedback component 522, internal feedback mechanism 554, or the like.

In some embodiments, the microcontroller 562 continuously measures a value from a current sensing circuit 555 (FIG. 5B) indicating an actual current drawn by the actuators 540 as they drive oscillation of the blade 514 and/or one or more values from the sensor 558 (e.g., a pressure sensor, impedance sensor, temperature sensor, multi-axis accelerometer, magnetometer, gyroscope sensor, and/or any other suitable sensor). The values from the current sensing circuit 555 and the sensor 558 can indicate various operation parameters for the electronic knife 510, such as total time operated, total time cutting, orientation of the electronic knife 510, oscillation frequency of the blade 514, a density of the subject materials, feedback forces from the blade 514, a weight of a user's hand, a user's grip, deformation of the blade 514, and/or various other suitable parameters. Each of the operation parameters can affect impact a resonant frequency for the blade 514. For example, when the density of the subject material changes, the resonant frequency of the blade 514 oscillating in the subject material also changes. Accordingly, in some embodiments, the microcontroller 562 tunes the frequency and/or wave shape of the input signal sent to the actuators 540 to adjust the oscillation of the actuators 540 to the resonant frequency as the resonant frequency changes. By adjusting the oscillations to the resonant frequency, the microcontroller 562 can ensure a maximum energy possible is converted from electrical energy into kinetic energy in the blade 514, increasing the efficiency of the electronic knife 510. The increased efficiency of the conversion can improve the performance of the electronic knife 510, ensuring smooth operation and a maximum reduction in force necessary to cut a subject material. For example, as the user slices the electronic knife 510 through her bread, the resonant oscillating frequency of the blade 514 can cut the bread with less force, less tearing, and less adhesion to the blade 514 compared to a blade oscillating at another frequency (or a traditional, non-oscillating blade). Further, the increased efficiency of the energy conversion can allow the electronic knife 510 to be compatible with additional form factors for the blade 514. For example, the increased efficiency of the energy conversion can allow the electronic knife 510 to reciprocate even blades as large as a cleaver without overdrawing from the power supply 560.

In some embodiments, the microcontroller 562 records telemetry data related to each usage session, which is stored in the memory. The telemetry data can indicate various performance metrics for the electronic knife 510, such as the amount of use the blade 514 has experienced since the last sharpening, a total operating time of the electronic knife 510, power consumed per session, and the like. In some embodiments, the microcontroller 562 provides telemetry data to the user (e.g., through the feedback component 522, internal feedback mechanism 554, and/or through a remote electronic device such as the user's phone) and/or to any other device in the electronic knife system (e.g., to the server 250 discussed above in FIG. 2).

For each of the operations of the electronic knife 510, the components of the electronic knife 510 can draw power from the power supply 560. For example, the microcontroller 562 can draw power from the power supply 560 to generate the input signals, and the power amplifier 556 can draw power from the power supply 560 to generate the boosted signal. In embodiments in which the power supply is one or more batteries, the microcontroller 562 can indicate a power status of the power supply 560 to the user. For example, the feedback component 522 can display an indication of the remaining battery, the microcontroller 562 can push updates to a remote electronic device regarding the remaining battery, and/or the internal feedback mechanism 554 can provide audible and/or haptic indications of the remaining battery. In some embodiments, the power supply 560 includes a primary cell that can be swapped when the battery is dead (or nearly dead). In some embodiments, the power supply 560 includes a secondary cell that can be recharged. In some such embodiments, the secondary cell is charged by a wireless charging base. The wireless charging base can generate a magnetic field that induces an electrical current in the power receiver 564 that can be used to charge the secondary cell. In some embodiments, the microcontroller 562 detects the reception of power and updates the indication of the power status to indicate that the electronic knife 510 is charging. In some embodiments, the power supply 560 is charged and/or powered during operation through a wired power connection (e.g., a USB connection, DC barrel jack connection, or the like).

Figures 6A, 6B, 6C:
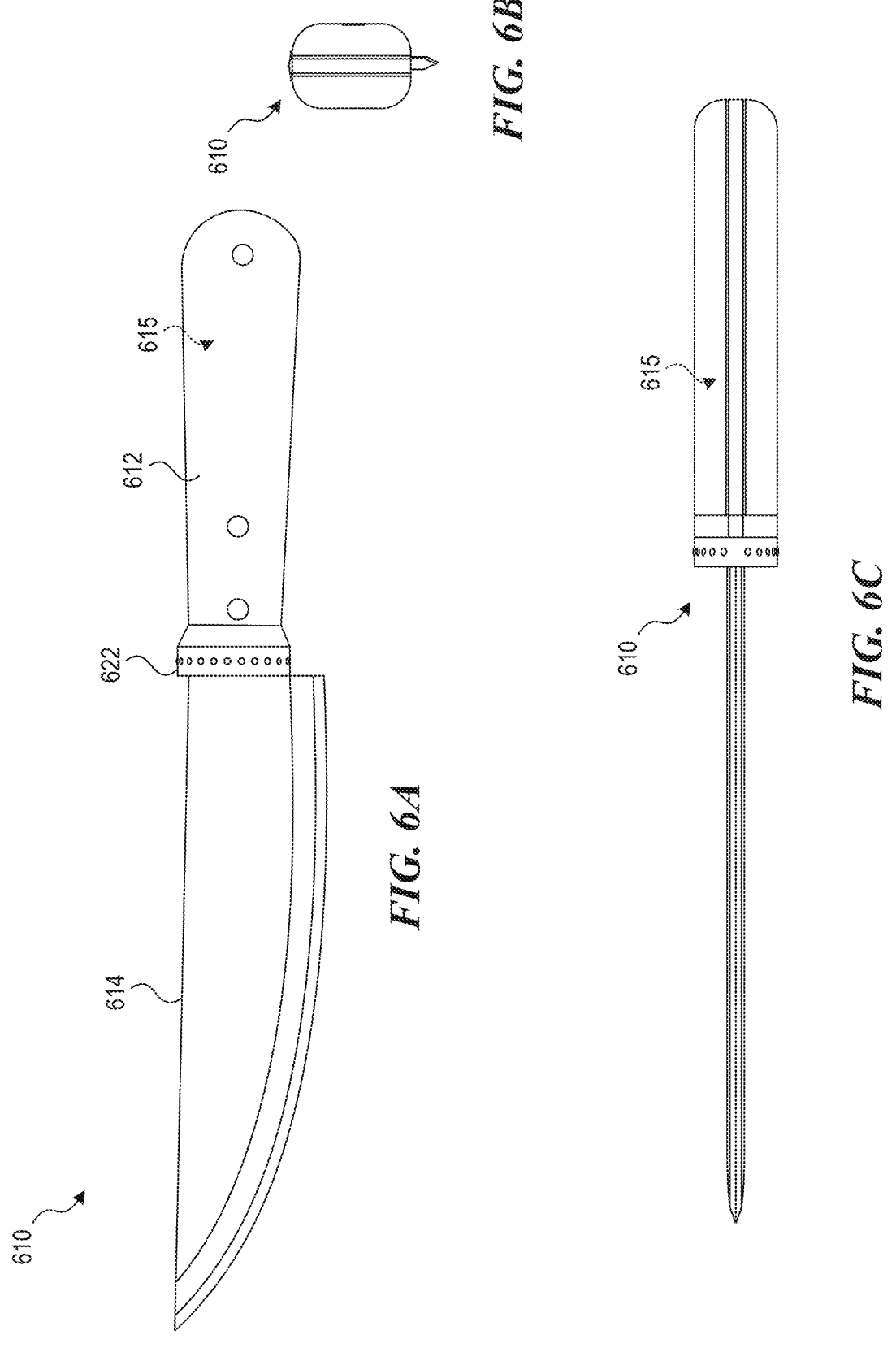
FIGS. 6A-6C are side, front, and bottom views of an electronic knife in accordance with further embodiments of the present technology.

FIGS. 6A-6C are a side view, front view, and bottom view, respectively, of an electronic knife 610 in accordance with further embodiments of the present technology. As illustrated in FIGS. 6A-6C, the electronic knife 610 is generally similar to the electronic knives 410, 510 discussed above with respect to FIGS. 4A-5B. For example, the electronic knife 610 includes a handle assembly 612 and a blade 614 carried by the handle assembly 612. Further, the handle assembly 612 carries and/or encloses a feedback component 622 and electronic components 615 for the operation of the electronic knife 610.

However, in the illustrated embodiment, the blade 614 has an alternative form factor (e.g., having a chef's knife profile). The alternative form factor of the blade 614 can be more useful for particular cutting tasks (e.g., cutting, slicing and disjointing meat; slicing, chopping or dicing fruits, vegetables and nuts; and the like) than the form factor of the blades 414, 514 discussed above with respect to FIGS. 4A-5B. The alternative form factor of the blade 614 also has features that effect the resonant frequency for the electronic knife 610 and/or where mechanical waves traveling through the blade 614 will concentrate. Accordingly, the electronic components 615 can adjust the operation of the electronic knife 610 to adapt to the alternative resonant frequency and/or the alternative concentration of mechanical waves. For example, the electronic components 615 can include a controller (or microcontroller) that adjusts the oscillation frequency of the electronic knife 610 to adapt to the alternative resonant frequency.

Further, in some embodiments, the electronic components 615 can include functions that take advantage of the alternative concentration of mechanical waves in the blade 614. For example, the smooth upward curve of the lower edge 620 at the distal tip 618 of the blade 614 can result in some mechanical waves concentrating at the distal tip 618. As a result, the magnitude of the mechanical waves can be greater at the distal tip 618, allowing (or improving) specialized functions of the electronic knife 610. For example, the higher magnitude of the mechanical waves at the distal tip 618 can help atomize liquid droplets at the distal tip 618, thereby improving the misting function of the electronic knife 610.

Figure 7:
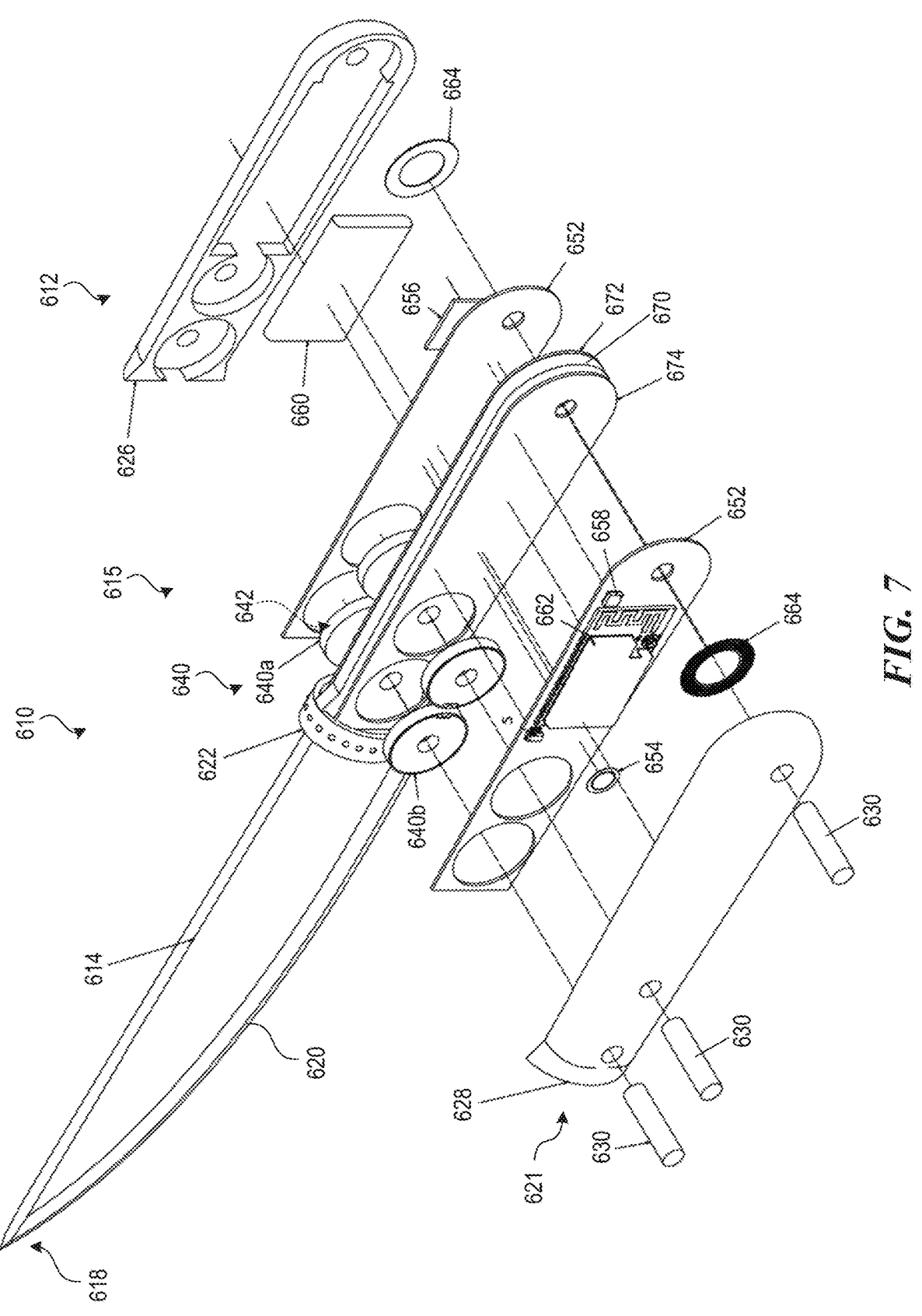
FIG. 7 is an exploded view of an electronic knife of the type illustrated in FIGS. 6A-6C in accordance with some embodiments of the present technology.

FIG. 7 is an exploded view of an electronic knife 610 of the type illustrated in FIGS. 6A-6C in accordance with some embodiments of the present technology. As illustrated in FIG. 7, the electronic knife 610 is generally similar in construction to the electronic knives 410, 510 discussed above with respect to FIGS. 4A-5B. For example, the electronic knife 610 includes a handle assembly 612 and a blade 614 carried by the handle assembly 612. Further, the handle assembly 612 a housing 621 that includes first and second scales 626, 628 that can be held together by rivets 632 and/or touch sensors 630. The housing 621 carries and/or encloses a feedback component 622 and electronic components 615 for the operation of the electronic knife 610. Further, the internal electronics include one or more actuators 640, one or more drivers 642, one or more sensors 658, a power amplifier 656, an internal feedback mechanism 654, a power supply 660, a power receiver 664, and one or more controllers 662 (or "microcontrollers 662," one shown) operably coupled to each of the components of the electronic components 615. Further, the internal electronics are carried on one or more PCBs 652 (two shown) within the handle assembly 612.

However, in the illustrated embodiment, the blade 614 includes a tang 670 that extends into the handle assembly 612 and is surrounded by dampening components 672, 674 that shelter the electronic components 615 and the handle assembly 612 from the oscillations of the blade 614 (and therefore the tang 670). In the illustrated embodiment, the actuators are mechanically coupled to the tang 670 through openings in the dampening components 672, 674, allowing the actuators 640 to transfer mechanical energy into the tang 670, thereby driving the oscillations of the blade 614. In the illustrated embodiment, the displacement direction of the actuators 640 is perpendicular to the face of the tang 670. Accordingly, rather than producing vibration of the blade 614 along the longitudinal axis of the blade 614, the illustrated arrangement produces inward pressure against the tang 670. The inward pressure can become a transverse longitudinal wave that travels down the length of the blade 614. In some embodiments, however, a complex actioning of the actuators 640 can cause the blade 614 to oscillate within any of the ranges of motion discussed above (e.g., along the longitudinal axis of the blade 614, along the transverse axis of the blade 614, vertically, rotating about the longitudinal axis of the blade 614 and/or in any other suitable direction). For example, when the first and second actuators 640*a*, 640*b* exert an equal inward force on the tang 670, the compression from both sides translates into outward longitudinal forces on the blade 614 and therefore longitudinal movement. Further, as the blade 614 tapers to the lower edge 620 (e.g., the cutting edge), the energy of the wave is concentrated into a smaller cross-sectional area, amplifying the displacement of the blade 614, and effecting the reflection of the wave back down the blade 614 into the tang 670. Accordingly, the actuators 640 can use the form factor of the blade 614 to generate intentional interference patterns, and therefore more complex motion of the blade 614. As discussed above, in various embodiments, the actuators 640 can be piezoelectric elements, electromagnetically driven actuators (e.g., powered electromagnets, voice coils, eccentric mass motors, linear resonant actuators), and/or any other suitable component to generate pressure into the tang 670 and/or movement of the blade 614.

Electromagnetically driven actuators can exert relatively large actuation forces from relatively low input voltages and currents. Accordingly, linear resonant actuators and eccentric mass motors are preferable for embodiments that include a blade 614 designed for low-frequency oscillations and/or high blade-displacement, such as embodiments having a blade 614 designed for cutting fibrous plant material. However, electromagnetically driven actuators are not typically capable of producing high-frequency (e.g., ultrasonic) oscillations and/or low blade-displacement. Accordingly, in some embodiments, the handle assembly 612 includes a combination of piezoelectric elements and electromagnetically driven actuators.

In some embodiments, the handle assembly 612 includes actuators 640 (of a single type of any combination) aligned along differing axes. For example, the handle assembly 612 can include one or more actuators 640 aligned with the longitudinal axis of the blade (e.g., as shown in FIGS. 5A and 5B) and one or more actuators 640 arrange perpendicular the longitudinal axis of the blade (e.g., as illustrated in FIG. 7). The multiple alignments can aid the handle assembly 612 in producing complex vibrations of the blade 614 in multiple resonant modes simultaneously. For example, a handle assembly 612 with multiple alignments can more easily generate resonant oscillations in both the longitudinal axis (e.g., to efficiently cut the subject material) as well as in a transverse axis (e.g., to shake cut pieces of the subject material off the blade 614). In some embodiments, an excitation source (e.g., rotor with an unbalanced mass) can be coupled to the blade or the handle assembly.

Although alternate form factors have been discussed herein with respect to differing arrangements of components within the handle assembly, one of skill in the art will understand that the present technology is not so limited. On the contrary, any of the form factors discussed above with respect to FIG. 1 can be combined with the arrangements of components within the handle assembly discussed above with respect to FIGS. 5A, 5B and 7. For example, the form factor of the blade 514 of FIGS. 5*a* and 5B can be a chef's knife, a paring knife, a boning knife, slicers, a santoku knife, a bread knife, cleavers, and/or any other suitable shape.

Further, in some embodiments, any one or more of the internal electronic components discussed above with respect to FIGS. 5A, 5B and 7 can be carried by the electronic knife external to the housing of the handle assembly. For example, in some embodiments, the microcontroller, one or more sensors, feedback components, actuators, and/or related circuitry can be arranged in a sheath or adapter that surrounds the handle assembly of an electronic knife. In some embodiments, the sheath can carry all of the internal electronic components, allowing the sheath to be applied to a traditional knife to give some, or all, of the functionalities described herein to any traditional knife.

In some embodiments, the electronic knife is powered via a power cord and electrical outlet. In some embodiments, the microcontroller, feedback devices, and battery, or any subset thereof, is carried by an additional assembly external to the enhanced knife. The additional assembly can allow for tethered operation of the electronic knife that does not need to be connected directly to an electrical outlet (e.g., the additional assembly can be connected to a larger external battery pack).

Figure 8A:
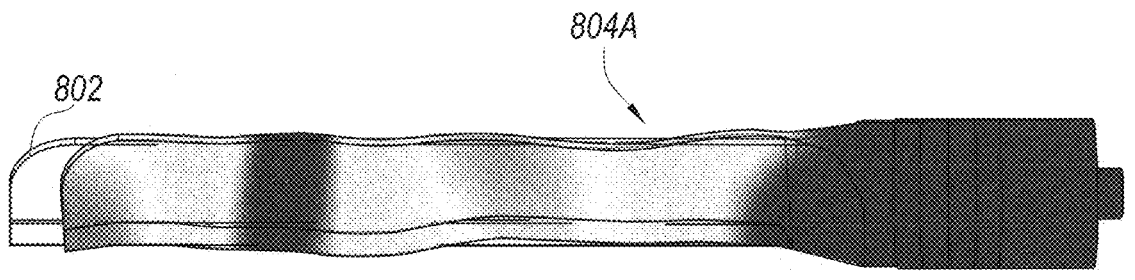
FIGS. 8A-8C illustrate various examples of a modal analysis of a blade of an electronic knife in accordance with some embodiments of the present technology.
Figure 8B:
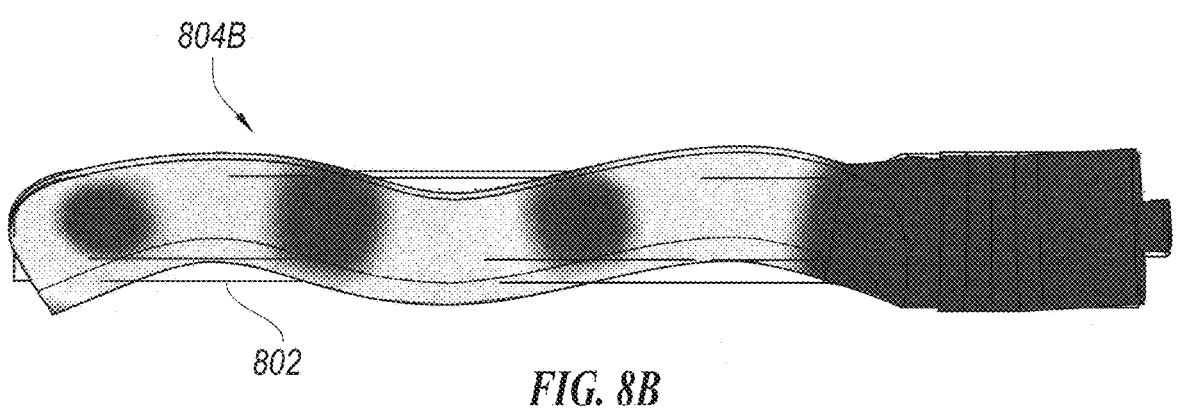
Figure 8C:
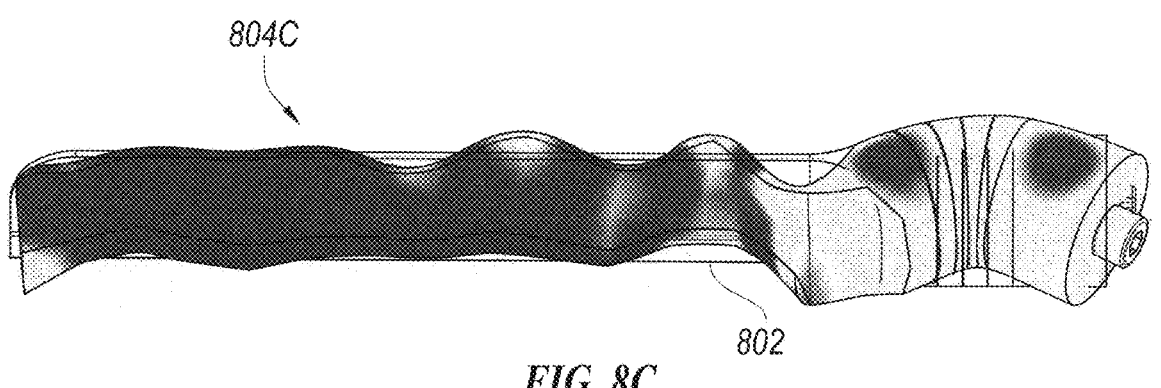

FIGS. 8A-8C illustrate various examples of a modal analysis of a blade of an electronic knife in accordance with some embodiments of the present technology. Modal analysis helps describe vibration characteristics and how an object may deform in response to an applied force, such as an oscillating force. Accordingly, in some embodiments, the electronic knife (e.g., through the microcontroller) can perform a modal analysis in real time to determine mode shapes (e.g., how the blade will elastically deform in response to an oscillating force), natural frequencies of the electronic knife and/or its components (e.g., blade, handle, etc.). The result of the modal analysis is partially dependent on the modulus of elasticity (e.g., modulus of elasticity of knife blade), mass, composition of component, and configuration of blade (e.g., moment of inertia, length, weight per unit length) of the blade; the mass of a user's hand and/or the user's grip; a mass, density, and composition of the subject material (e.g., the medium in which the blade oscillates in); the frequency of the oscillation; the scale of the oscillation (e.g., the travel length of the oscillation); and various other factors. In some embodiments, the modal analysis is completed using known methods such as Finite Element Analysis to simulate the oscillation and deformation using a computer.

The examples of the modal analysis shown in FIGS. 8A-8C illustrate mode shapes of the blade assembly in response to excitation at different frequencies. In each example, an outline 802 of the original blade shape is provided, along with an exaggerated outline 804 (referred to in each figure as outlines 804A-C) of the blade displacement. The magnitude of the displacement of the blade is indicated by a shading scale along the blade.

FIG. 8A illustrates an outline 804A representing a first modal analysis of the blade at an oscillating frequency of about 26604.31 Hz, at otherwise constant operation parameters for the electronic knife. Given the operation parameters, the blade's mode shape is generally planar with primary movement is in a longitudinal axis along the length of the cutting edge of the outline 802. When shown in animation, the outline 804A expands and contracts longitudinally. Other dimensions of displacement are also apparent, such as a distortion of the outline 804A in a "flag wave" pattern. In various embodiments, the maximum amplitude of displacement from the midplane of the blade to the length of the blade can be between about 0.01 μm and 3000 μm, between about 0.05 μm and about 2000 μm, or between about 0.1 μm and about 500 μm. For example, an actuator can provide an operational frequency to keep elastic deformation (e.g., maximum or average amplitude of displacement from midplane) of the blade relative to a midplane of the blade below a target level, such less than 500 μm, 1000 μm, 2000 μm, or 3000 μm. However, the additional displacements are minimal compared to the primary movement along the longitudinal axis. The illustrated outline 804A is preferred for cutting operations with the electronic knife 110 (FIG. 1). Accordingly, in some embodiments, the microprocessor can use modal analysis simulations to adjust the oscillating frequency to target the outline 804A and/or to account for changes in other factors (e.g., the medium the blade oscillates in) to maintain the outline 804A. Additionally, or alternatively, the microprocessor can auto-tune the oscillating frequency to obtain the outline 804A at a stable resonance nearest to that frequency (e.g., tune the blade oscillation to a resonant frequency with the targeted outline 804A).

FIG. 8B illustrates an outline 804B representing a second modal analysis of the blade at an oscillating frequency of about 21884.29 Hz and the constant operation parameters. Given the operation parameters, the primary displacement of the blade is in a transverse axis relative to the length of the cutting edge of the outline 802. Further, the illustrated outline 804B is associated with significant movement in the transverse direction. For example, in various embodiments, the maximum amplitude of displacement from the midplane of the blade to the length of the blade can be between about 0.0a μm and 1000 μm in the transverse direction, and between about 0.01 μm and about 500 μm in the longitudinal direction. The illustrated outline 804B (and associated movement) does not efficiently produce a sawing motion along the cutting edge. However, the illustrated outline 804B (and associated movement) can have advantages for other operations of the electronic knife. For example, the transverse movement of the blade in the outline 804 can help dislodge stuck food particles, aid in other cleaning operations, and/or help atomize liquid particles on the blade.

FIG. 8C illustrates an outline 804C representing a third modal analysis of the blade at an oscillating frequency of about 29730.39 Hz and the constant operation parameters. Given the operation parameters, the primary displacement of the blade is in a transverse axis relative to the length of the cutting edge of the outline 802. This outline 804C (and associated movement) is inefficient for cutting operations because it does not create a sawing motion along the cutting edge. For example, in various embodiments, the maximum amplitude of displacement from the midplane of the blade to the length of the blade can be between about 0.01 μm and 400 μm in the transverse direction, and between about 0.01 μm and about 100 μm in the longitudinal direction. Further, as illustrated, the primary displacement of the outline 804C (and associated movement) primarily displaces a proximal end of the blade. Accordingly, the associated movement does not result in the same amount of alternative advantages as the movement discussed above with respect to FIG. 8B. For example, because the transverse movement is concentrated at the proximal end of the blade, the transverse movement does not atomize liquid particles as well as the movement discussed above with respect to FIG. 8B. Further, because the transverse movement is concentrated at the proximal end, the transverse movement can be imparted largely into the handle assembly, further reducing the functionality of the electronic knife.

As illustrated by FIGS. 8A-8C, the frequency of the applied force can determine whether the blade of the electronic knife reciprocates in a manner that is helpful for the electronic knife's intended operations (e.g., cutting a subject material). Accordingly, as discussed above, one or more of the components of the electronic knife system 100 (FIG. 2) can perform a modal analysis (or any other suitable analysis) to determine a desired frequency (e.g., a resonant frequency, frequency for target mode shape, etc.) for the intended operations. In some embodiments, the vibration analysis can include a modal analysis that accounts for various known operation parameters (e.g., the weight of the blade, the medium in which the blade was oscillating, properties of the blade (e.g., modulus of elasticity), dampening sources, and the like to determine the desired resonant frequency. The dampening sources can include both internal dampening sources (e.g., from the dampening component) and/or external dampening sources, such as the forces absorbed by the handle (e.g., from the mass of a user's hand). In some embodiments, the modal analysis can be updated as changes in any of the variables are sensed (e.g., through the sensors discussed above with respect to FIGS. 5A and 5B). In some embodiments, the modal analysis uses predetermined operation parameters based on inputs from the user. For example, the user can indicate the intended subject material (e.g., through a portable electronic device 220 (FIG. 2)).

Any of the electronic knives disclosed herein will have one or more natural resonant frequencies, which will vary depending on the operation parameters of the electronic knife. That is, the electronic knife can have multiple frequencies at which pressure waves traveling through the system will interfere in an additive manner, producing the maximum stress and displacement on the system. When the electronic knife (or a knife blade) is oscillated at exactly the resonant frequency, it achieves a theoretical maximum energetic state, and therefore a maximum cutting power. However, as the operation parameters of the electronic knife change, so will the natural resonant frequencies. For instance, an electronic knife sitting on the counter will have a different natural resonant frequency than when it is dampened in the hand of a user. And that frequency will change again when the cutting edge of the knife is embedded in the subject material compared to oscillating in the air.

Accordingly, as discussed above, the electronic knife can continuously monitor one or more operation parameters and adjust the oscillation frequency of the actuators to "tune" to the natural resonance of the electronic knife and/or another desired frequency (e.g., natural frequency of the blade rather than the natural frequency of the entire electronic knife, a frequency associated with the user's hand and knife, a frequency associated with another desired function of the knife, and the like).

Well known methods for tuning an oscillating system exist the field of ultrasonics. Example tuning methods are described in U.S. Pat. No. 4,551,690A to Quist and U.S. Pat. No. 5,959,390A to Boukhny, each of which is incorporated herein by reference in its entirety. These methods measure the relative phases of the voltage and capacitance of a system and adjust the driving frequency to align the phases. In contemporary electronic systems, the phase measurement and comparison can be performed on an integrated circuit, such as the Texas Instruments CD74HC4046A, integrated into the microcontroller. The output of the integrated circuit can be provided to the signal generator of the microcontroller to complete the auto-tuning loop. Alternately, in some embodiments, an autotuning algorithm seeks to maximize the current drawn from the actuators by adjusting the frequency of the signal generator. In various embodiments, the microcontrollers 562, 662 (FIGS. 5A, 5B, and 7) and/or any other suitable component can employ either, or both, methods to tune the oscillation of the electronic knife to optimize the cutting power and/or other functionalities of the electronic knife.

In some embodiments, the autotuning method described above accepts a center frequency and bandwidth as parameters for tuning. For instance, an assembled electronic knife can have a natural longitudinal resonance frequency, representing the resonance frequency when the electronic knife is floating and oscillating in air. The natural resonance frequency can be determined by a computer simulation (e.g., the modal analysis discussed above) and/or by physical measurement techniques through any of the sensors discussed above. In some embodiments, the electronic knife can have a natural longitudinal resonance frequency of about 27.0 KHz. Accordingly, in such embodiments, the center frequency can be set to 27.0 KHz. The bandwidth parameter represents a range of searchable frequencies above and below the center frequency in which the autotuning algorithm looks to maximize current-voltage phase alignment and/or total output power. For instance, the search bandwidth for a given enhanced knife may be set at about 16 KHz (meaning that the autotuning algorithm can search between 11 KHz and 43 KHz), or about 8 KHz (meaning that the autotuning algorithm can search between 19 KHz and 35 KHz). The bandwidth parameter can reflect an expected range for the actual resonant frequency of the electronic knife when the knife is held in various users' hands, cutting into various subject materials, or otherwise disturbed from the natural resonance frequency. In some embodiments, the bandwidth parameters are predetermined when the electronic knife is designed to ensure that the search bandwidth doesn't overlap between resonance modes. For example, if the electronic knife is intended to operate in the longitudinal resonance mode, the bandwidth parameters can avoid searching within a frequency range that would put the electronic knife in a transverse resonance mode. In some embodiments, the center frequency and bandwidth parameters are saved to a memory in the microcontroller in the electronic knife.

It will be understood that the center frequency and bandwidth parameters are determined by the physical characteristics of the electronic knife assembly. For example, different knife shapes (e.g., chef's knives, bread knives, cake cutting knives, etc.) will have different values for the center frequency and bandwidth parameters. However, the process of the autotuning algorithm itself not affected by the physical characteristics of the electronic knife assembly.

In some embodiments, as discussed in more detail below, the blade of the electronic knife is removable from the handle assembly. In some such embodiments, the center frequency and bandwidth parameters vary between the changeable blades. These parameters can be predetermined (e.g., by a blade manufacturer) and supplied with the changeable blade; can be entered or looked up through a companion software application (e.g., a module on the server 250 (FIG. 2)); and/or determined when the changeable blade is installed, for example, by a calibration procedure. In one embodiment, the user is instructed to set the electronic knife, with the changeable blade is installed, on a surface for the calibration procedure. The electronic knife can then sweep through a broad frequency spectrum, for instance from about 1 KHz to about 300 KHz to find relevant resonant frequencies of the electronic knife with the changeable blade. The determined frequencies can then be stored as center frequencies from which the user can select for operation. In some embodiments, the bandwidth parameter for each center frequency is assigned as a fixed percentage, for example about 1%, 5%, 10%, 20% or any other suitable amount above and below a determined center frequency.

In various embodiments, the resonant oscillation frequencies are expected to be between about 100 Hz and about 300 KHz, between about 1 KHZ and about 100 KHz, or between about 10 KHz and about 40 KHz for an electric knife with a linear resonant vibration motor, an eccentric mass motor, voice coil, and/or an electromagnetic actuator. For an electric knife with a piezoelectric transducer for the actuator, the resonant oscillation frequency is expected to be between about 10 KHz and about 65 KHz. In some embodiments, the microcontroller can target a resonant frequency greater than about 40 KHz to oscillate at a vibration frequency that is above the audible hearing range of most humans. However, the higher frequency oscillations require more input power and can cause the electronic knife to wear more quickly. Accordingly, in some embodiments, the microcontroller can target a resonant frequency so at a relatively lower frequency.

The amplitude of the oscillations is measured by the displacement of any point on the lower edge (e.g., the cutting edge) of the blade. The optimal displacement amplitude can depend on the subject material. For homogenous foods (such as cheese) or foods prone to fracturing (such as a baked pastry), a small displacement amplitude at high frequency is advantageous for minimizing the size of stroke marks across the product and the shearing of the processing food. Alternatively, for a subject materials with relatively large-scale internal structures (such as hard-crusted bread and fibrous vegetables), a larger displacement amplitude can help move the cutting edge of the blade across the internal structures to shear bundles of strong molecular bonds that allow those structures to support themselves. Accordingly, in various embodiments, the electronic knife can select the displacement based on detected characteristics of the subject material, information input by the user, and the like.

In some embodiments, the expected displacement amplitude (in any axis of motion) is between about 0.1 μm and about 500 μm. In some embodiments, the displacement amplitude can also be partially determined by the oscillation frequency. For example, in embodiments with a relatively low oscillation frequency, the displacement can exceed 2000 μm, corresponding to applications where a large mechanical motion is advantageous (e.g., when cutting fibrous material).

The waveform of the oscillation signal can also take many forms, depending on the natural resonance characteristics of the electronic knife and/or the intended use. However, the input signals from the microcontroller are in a sine wave, square wave, or triangle wave form in most embodiments in order to achieve desired performance from the actuators.

Figure 9:
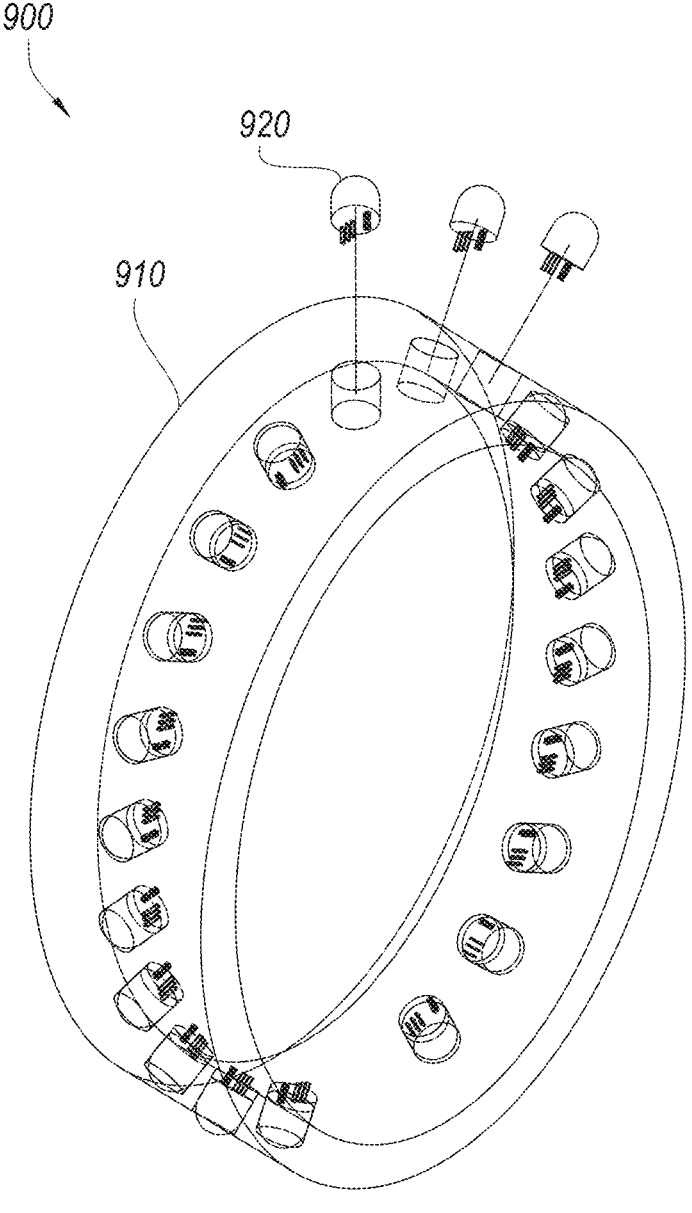
FIG. 9 is an isometric view of a feedback component in accordance with some embodiments of the present technology.

FIG. 9 is an isometric view of a feedback component 900 in accordance with some embodiments of the present technology. In the illustrated embodiment, the feedback component 900 includes a ring-shaped housing 910 and a plurality of indicator lights 920. The ring-shaped housing 910 can be configured to wrap around any of the handle assemblies 412, 512, 612 discussed above to provide the user with visual feedback and/or indications from the plurality of indicator lights 920. For example, the indicator lights 920 can indicate a status of the electronic knife (e.g., powered on, oscillating, powered off, and the like), an angle of the electronic knife with respect to vertical and/or a previously calibrated starting angle, an angle to hold the electronic knife for a selected operation (e.g., to cut a subject material, sharpen the blade, and the like), a status of the power supply, and/or any other suitable indication.

In some embodiments, the feedback component 900 includes a continuous stream of indicator lights 920 around the ring-shaped housing 910 for precise indications or feedback. In some embodiments, the feedback component 900 includes indicator lights 920 at predetermined increments (e.g., every 5 degrees, 6 degrees, 10 degrees, 12 degrees, 20 degrees, 30 degrees, 50 degrees, or any other suitable increment). In some embodiments, the ring-shaped housing 910 is made from a metal or other suitable material designed to accent and/or to further counterweight the electronic knife. In some embodiments, the indicator lights are light emitting diodes (LEDs), such as RGB LEDs, and/or any other suitable light sources.

Figure 10B:
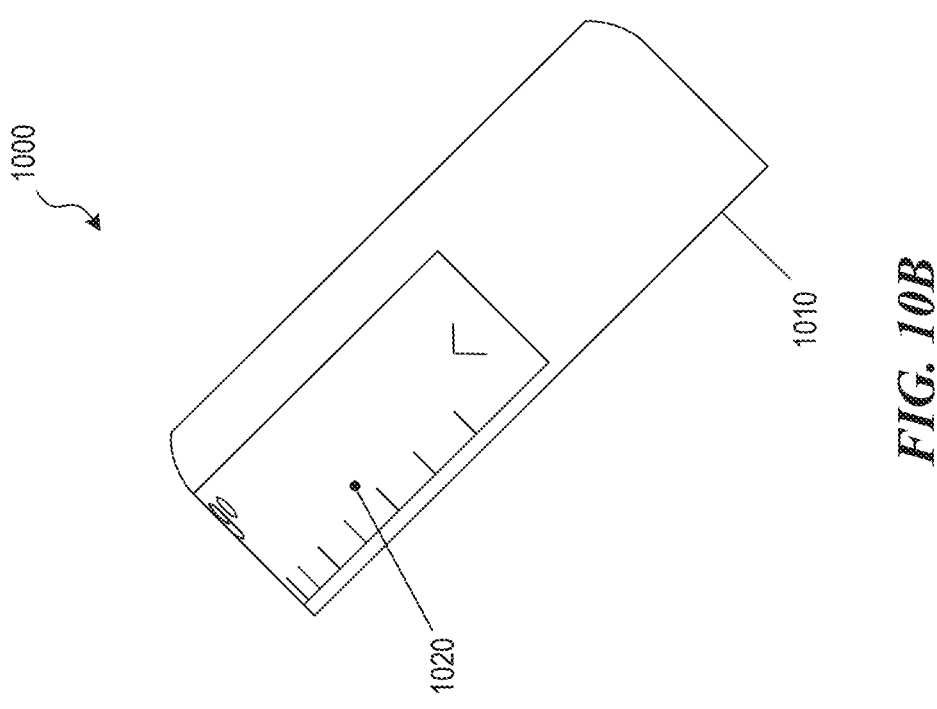
FIGS. 10A and 10B are isometric views of a feedback component in accordance with some embodiments of the present technology.
Figure 10A:
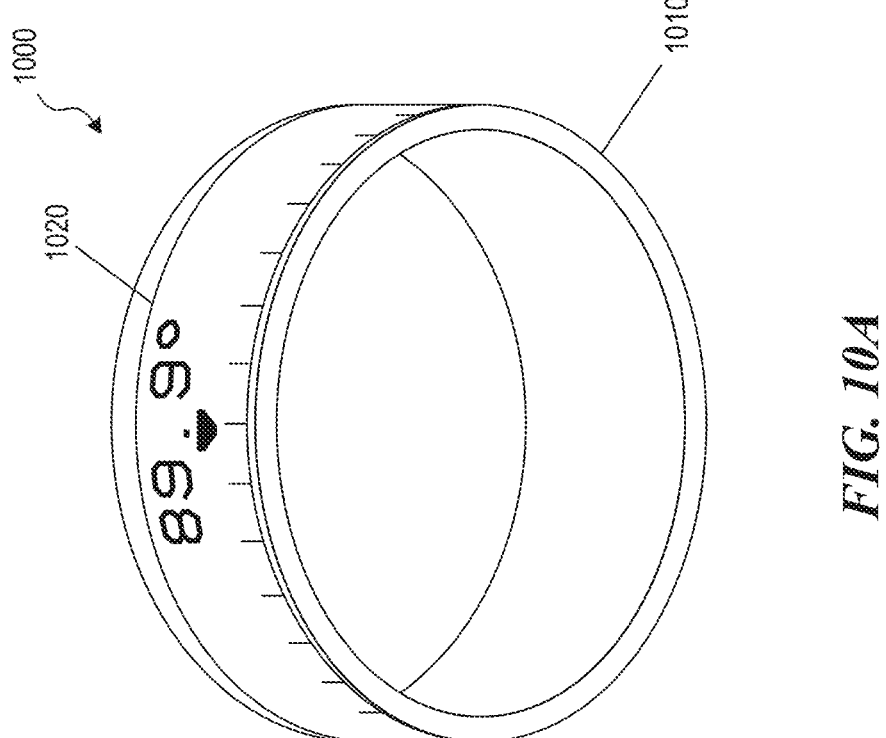
Figures 11A, 11B, 11C, 11D, 11E:
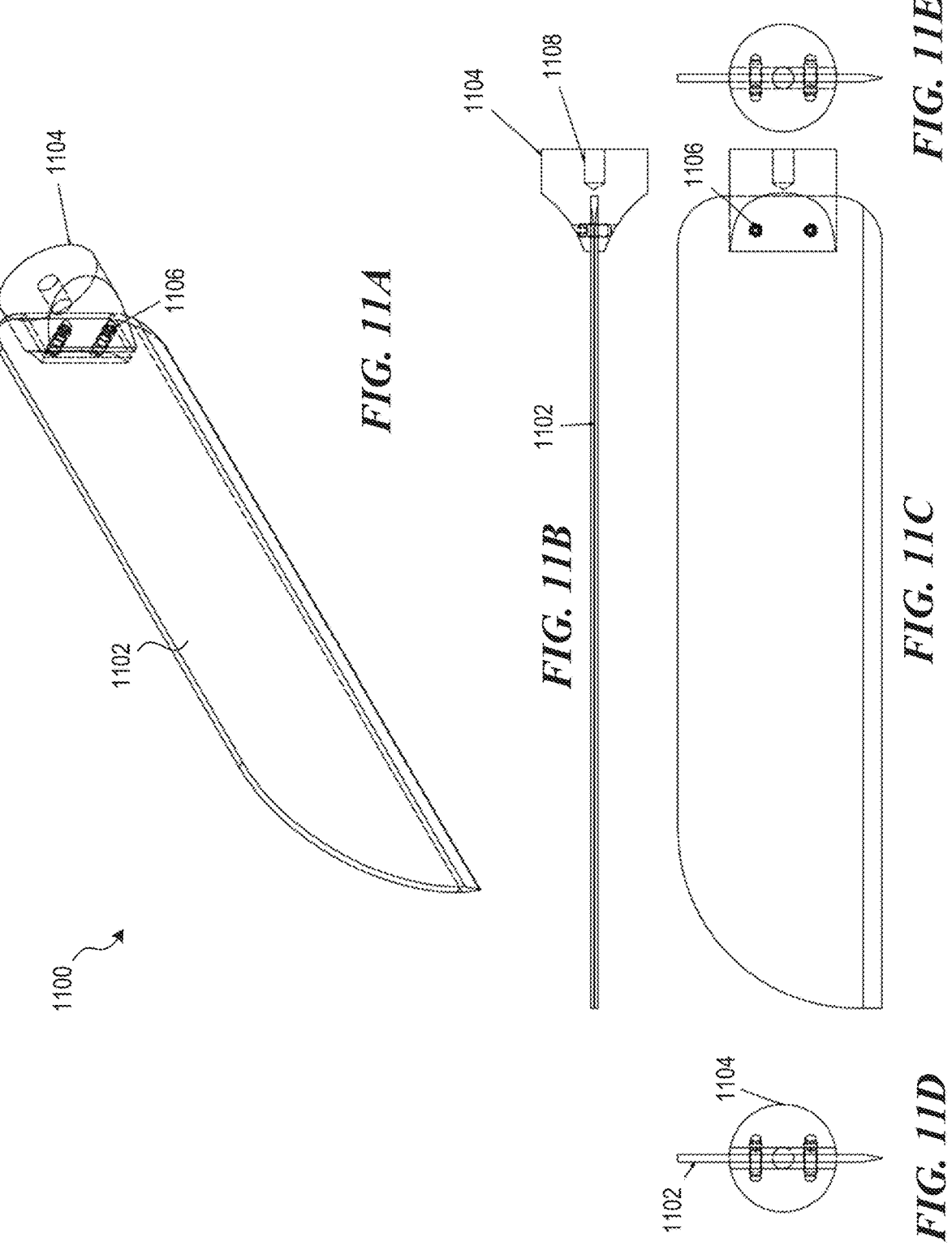
FIGS. 11A-11E are isometric side, top, side, front, and rear views of a system for changing the blade of an electronic knife in accordance with some embodiments of the present technology.

FIGS. 10A and 10B are isometric views of a feedback component 1000 in accordance with some embodiments of the present technology. In the illustrated embodiment, the feedback component 1000 includes a ring-shaped housing 1010 and a feedback screen 1020. The ring-shaped housing 1010 can be configured to wrap around any of the handle assemblies 412, 512, 612 discussed above to provide the user with visual feedback and/or indications from the feedback screen 1020. For example, the feedback screen 1020 can indicate a status of the electronic knife (e.g., powered on, oscillating, powered off, and the like), an angle of the electronic knife with respect to vertical and/or a previously calibrated starting angle, an angle to hold the electronic knife for a selected operation (e.g., to cut a subject material, sharpen the blade, and the like), a status of the power supply, and/or any other suitable indication.

In some embodiments, the feedback screen 1020 wraps entirely around the ring-shaped housing 1010. In other embodiments, the feedback screen 1020 wraps around only an upper portion of the ring-shaped housing 1010. In various embodiments, the feedback screen 1020 can include a precise indication of an angle of the electronic knife (e.g., through a textual display) and/or indications at predetermined increments (e.g., every 5 degrees, 6 degrees, 10 degrees, 12 degrees, 20 degrees, 30 degrees, 50 degrees, or any other suitable increment). In some embodiments, the ring-shaped housing 1010 is made from a metal or other suitable material designed to accent and/or to further counterweight the electronic knife. In some embodiments, the feedback screen 1020 is a flexible LED screen, a flexible LCD screen, and/or any other suitable screen.

As discussed above, in some embodiments, the electronic knife can have changeable (e.g., swappable or replaceable) blades. FIGS. 11A-11E are an isometric side, top, side, front and rear views, respectively, of a system 1100 for changing the blade 1102 of an electronic knife in accordance with some embodiments of the present technology. The system 1100 includes one or more changeable blades 1102 (one shown) and a holding element 1104 operably coupleable to the changeable blades 1102. In the illustrated embodiment, the holding element 1104 is a bolster that can be secured to the changeable blades 1102 by one or more fixation elements 1106 (two shown) (e.g., bolts, screws, pins, rivets and/or any other suitable fasting element). In various other embodiments, the holding element 1104 can have various other forms, such as a clipping element, a magnetic element, a locking element, and the like. In various embodiments, the holding element 1104 is a single piece or separate pieces. In some embodiments, the holding element 1104 is also interchangeable with the electronic knife. For example, the holding element 1104 can be attached to the stack bolt 546 (FIGS. 5A and 5B) at receiving thread 1108. In various other embodiments, the holding element 1104 is attached to the electronic knife by a screwing mechanism, rivets, an/or any other suitable mechanism. In some embodiments, the holding element 1104 is a permanent feature of the handle assembly.

As discussed above, the changeable blades 1102 can allow the electronic knife to have multiple different form factors. For example, one changeable blade can have the form factor of a chef's knife illustrated in FIGS. 6A-7, one changeable blade can have the rectangular shape illustrated in FIGS. 11A-11E, and one changeable blade can have a cleaver shape (not illustrated). As a result, the changeable blades 1102 can increase the adaptability and/or flexibility of the electronic knife. However, as also discussed above, each time the changeable blades 1102 are swapped out, the new blade can affect the resonant frequency of the electronic knife, thereby requiring running the autotuning algorithm, receiving inputs from the user, and/or receiving inputs from another source (e.g., the server 250 of FIG. 2). In some embodiments, the system 1100 is a single piece of material in which the holding element 1104 and blade 1102 are a single piece that can be interchanged with the handle assembly 412 (FIG. 4A). For example, the holding element 1104 can include a mechanism (e.g., a screw track mounting mechanism) to attach to the handle assembly 412.

Systems for Maintaining the Electronic Knife

Figure 12:
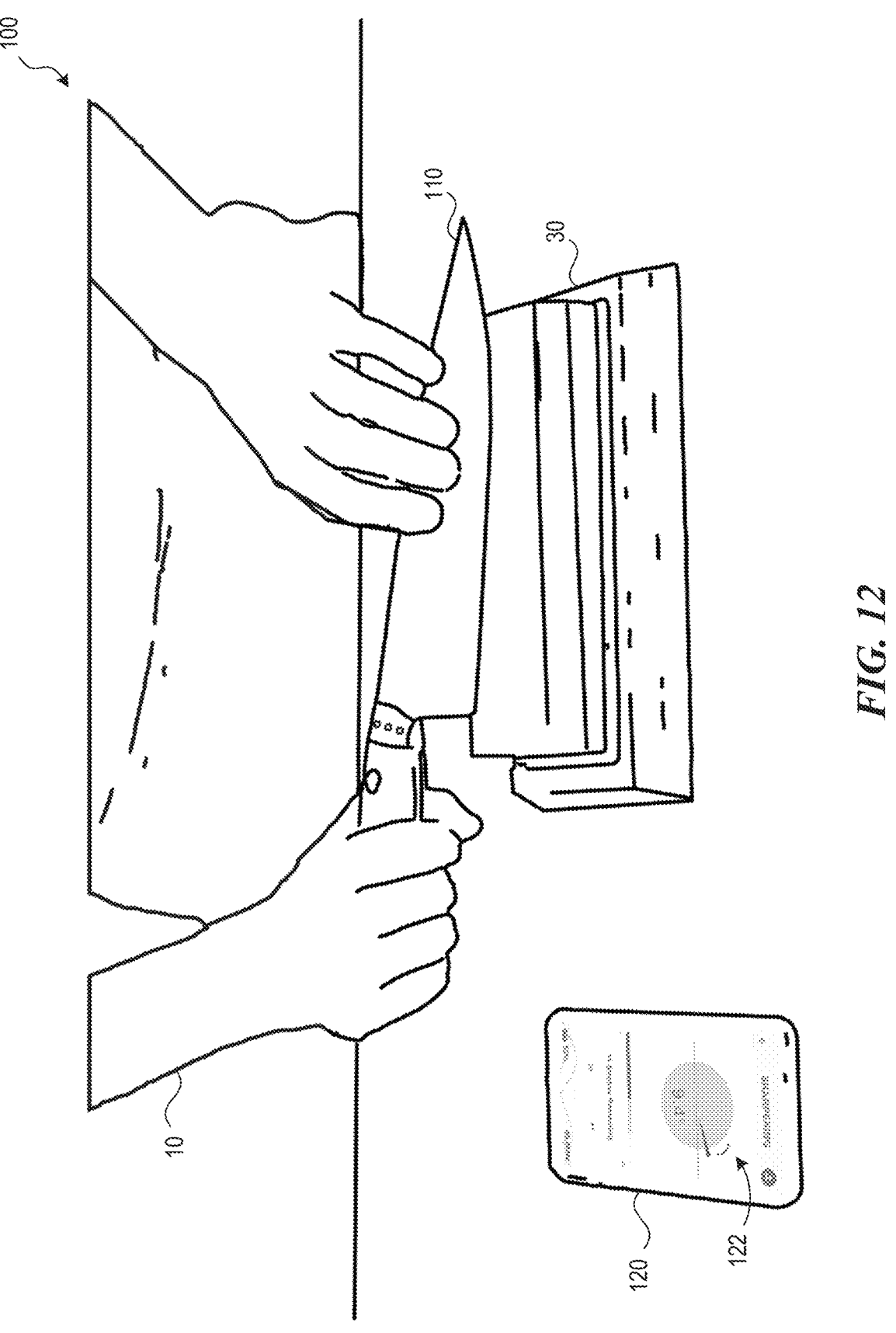
FIG. 12 is an illustration of a user sharpening an electronic knife in accordance with some embodiments of the present technology.

FIG. 12 illustrates a user 10 sharpening an electronic knife 110 in accordance with some embodiments of the present technology. When sharpening any knife blade, it is typically desirable to match the angle of sharpening to the angle established on the blade-edge by the manufacturer. For example, resharpening a blade to the original angle minimizes the amount of blade edge material removed during the resharpening process (although, in some cases, the user may wish to establish a new blade angle to suit her preferences for sharpness versus durability). The angle established on the blade-edge varies with knife styles, manufacturer, and knife construction, but is often set around 12 degrees.

To sharpen a knife, the user 10 holds their knife at the appropriate angle against the face of a sharpening device 30 (e.g., a whetstone) and moves the blade in a sweeping motion across the surface of the sharpening device 30. The grit of the sharpening device 30 pushes and/or removes material from the knife blade to step towards a sharpened edge. The user 10 then repeats this process for the other face of the blade (if the knife has a double edge) and works their way up through finer grit devices. The process can take several minutes or longer per knife and requires that the blade is held at precisely the right angle to ensure a consistent edge. Further, the time it takes per grit can vary based on the amount of pressure the user applies to the knife during the sweeping motion, the consistency of the user's motion, the dullness of the knife blade when the user 10 begins the resharpening process, and/or various other factors. Accordingly, it can be very difficult for a typical user (including many culinary professionals) to properly resharpen their knife.

In some embodiments, the electronic knife system 100 includes features to aid the user 10 in the resharpening process. For example, in the illustrated embodiment, the electronic knife system 100 includes a remote electronic device 120 (e.g., the user's smartphone) with a user interface 122 that aids the user 10 in resharpening the electronic knife 110. Further, as discussed below, the electronic knife 110 itself can include features, such as a user interface on the feedback component 422 (FIG. 4A), that aid the user 10 in resharpening the electronic knife.

In some embodiments, the sharpening device 30 includes a communication device, a tag, and/or an indicator configured to communicate information to the electronic knife 110 and/or the remote electronic device 120. For example, the sharpening device 30 can include an embedded NFC tag that is detected by the electronic knife 110 and/or the remote electronic device 120 to automatically know the grit of the sharpening device 30. In various embodiments, the sharpening device 30 includes a visual tag, QR code, and/or another electronic tag to communicate information about itself.

In some embodiments, electronic knife 110 is powered on (e.g., the blade oscillates, while the user 10 resharpens the blade to accelerate the process. In various embodiments, the user 10, controller within the electronic knife 110, and/or the remote electronic device 120 can adjust the frequency, wave shape, and/or amplitude of the oscillations to a level best suited to resharpening against the sharpening device 30. In some embodiments, the selected frequency, wave shape, and/or amplitude best suited to resharpening is optimized for the specific grit of the sharpening device 30. In other embodiments, the selected frequency, wave shape, and/or amplitude is constant the resharpening process.

In some embodiments, the sharpening device 30 can also include one or more electronic components, such as any of the electronic components 515 discussed above with respect to the handle assembly 512 of FIGS. 5A and 5B. The electronic components, such as the signal generator, power supply, amplifier, actuator, and/or other elements, can excite the sharpening stone with an oscillating, mechanical motion. As a result, a static blade of a knife (electronic or traditional) can then be placed against the electronic sharpening device 30 for sharpening.

Figure 13A:
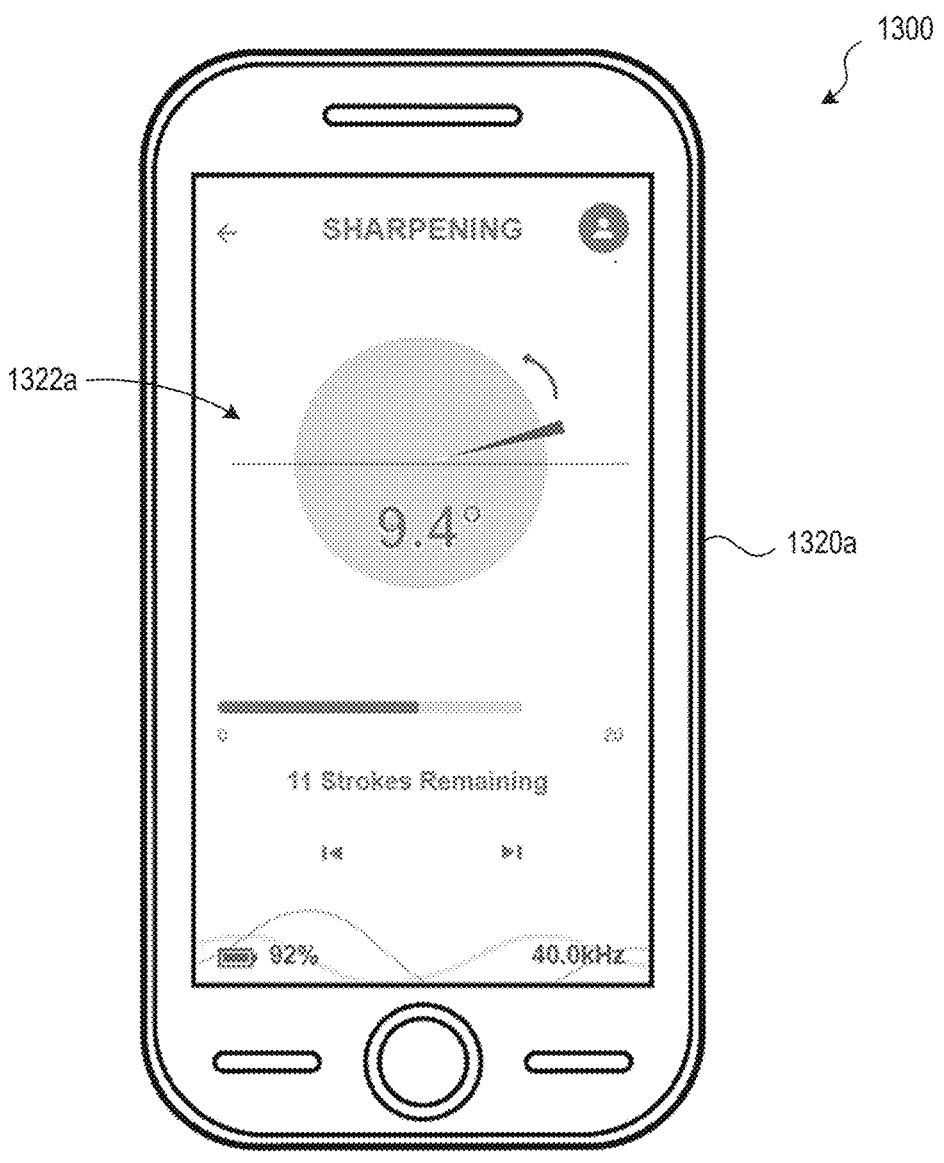
FIGS. 13A and 13B are illustrations of example user interfaces associated with the electronic knife system in in accordance with some embodiments of the present technology.
Figure 13B:
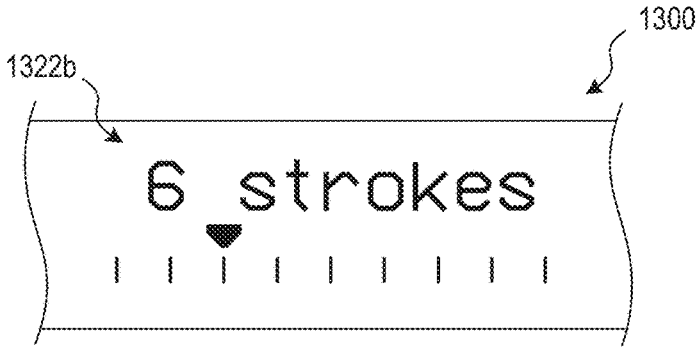

FIGS. 13A and 13B illustrate various user interfaces for aiding the user in sharpening a knife in accordance with some embodiments of the present technology. For example, as illustrated in FIG. 13A the system 1300 can include a remote electronic device 1320A, such as the user's smartphone, tablet, portable computer, and/or any other suitable device, that runs a user interface 1322A. The user interface 1322A can include instructions for performing the sweeping motion, a virtual tutorial for resharpening the knife, an indication of the angle at which to hold the electronic knife, an indication of an adjustment to the current angle of the electronic knife, an indication of the number of strokes remaining before changing grit and/or flipping the side, operating conditions for the electronic knife (e.g., the current oscillation frequency and/or the remaining charge of the power supply), and/or any other suitable information. Following the tutorials, instructions, and referring to the indications, the user 10 (FIG. 12) can obtain an improved result resharpening their electronic knife.

FIG. 13 illustrates an example user interface 1322B that can be displayed on the electronic knife itself, for example on the feedback component 422 (FIG. 4A). In the illustrated embodiment, the user interface 1322B includes an indication of the angle at which to hold the electronic knife (e.g., orient the indicated marker upwards) and an indication of the number of strokes remaining before changing grit. In some embodiments, the user interface 1322B can also include various other indications, such as an indication to increase the pressure applied to the electronic knife, an operating status of the electronic knife, and the like. Referring to the indications on the user interface 1322B, the user 10 (FIG. 12) can obtain an improved result resharpening their electronic knife.

Systems for Charging the Electronic Knife

Figure 14:
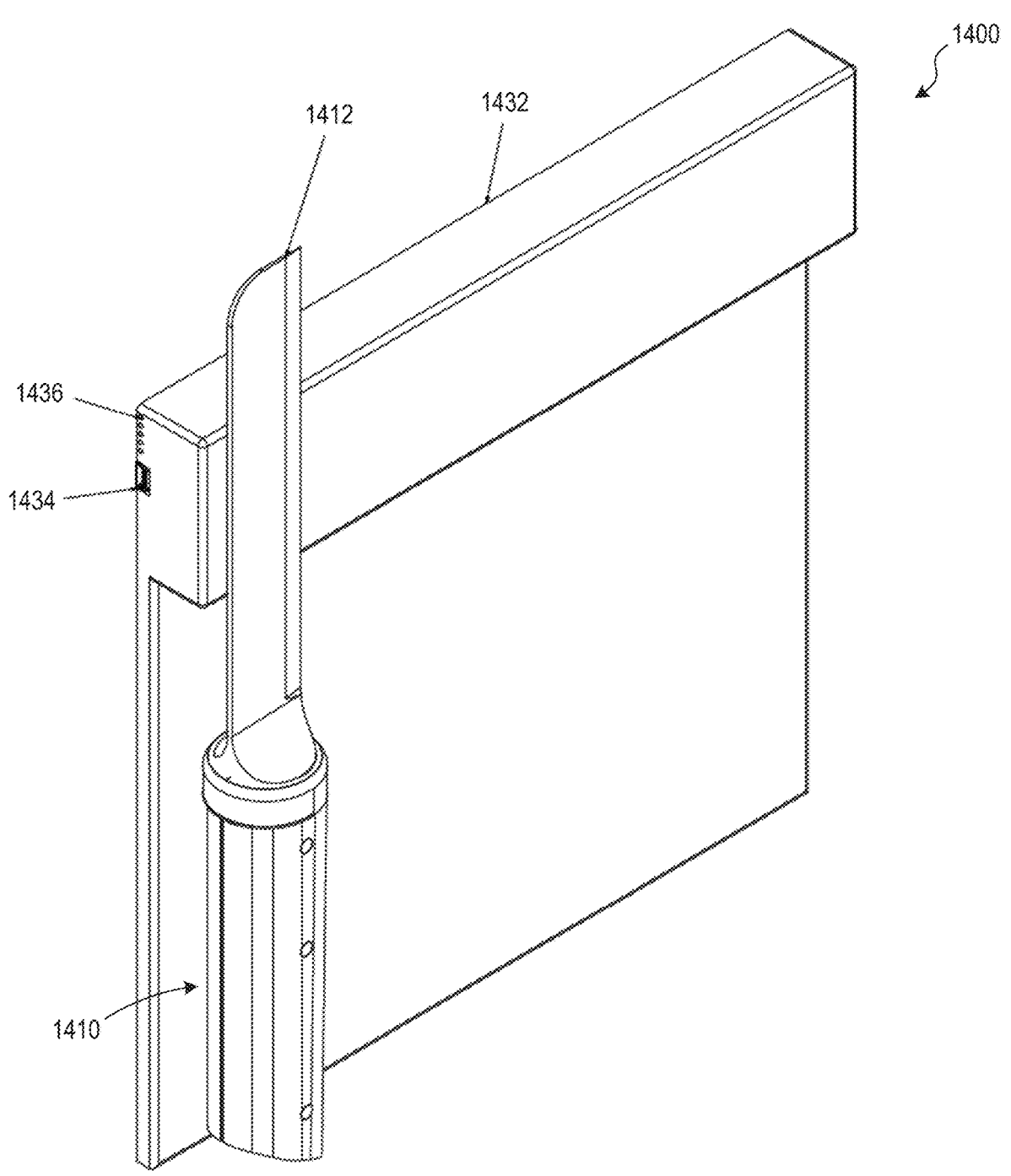
FIG. 14 is an isometric view of components of an electronic knife system in accordance with some embodiments of the present technology.
Figure 15:
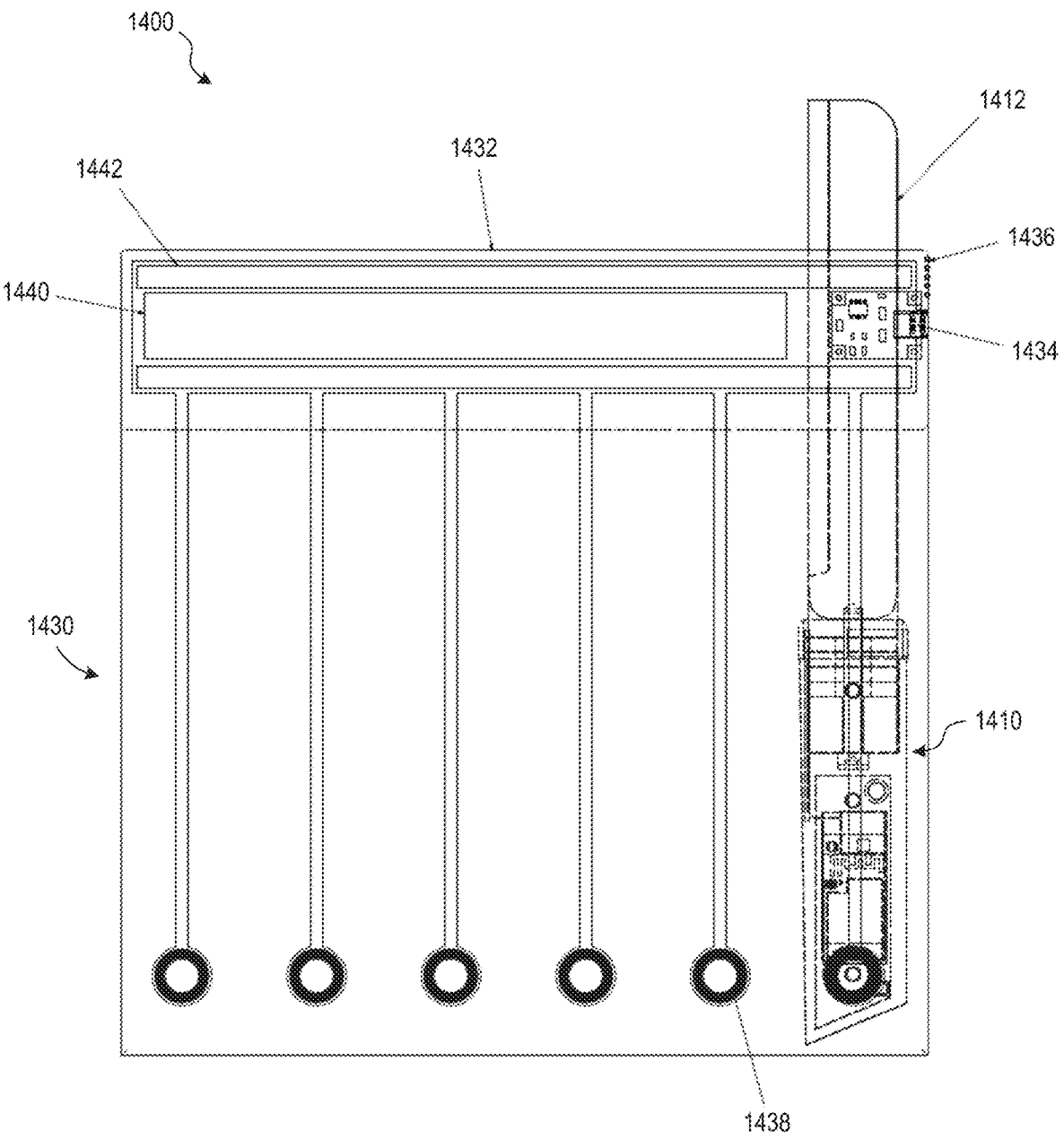
FIG. 15 is an isometric view of components of an electronic knife system in accordance with further embodiments of the present technology.

FIGS. 14 and 15 are isometric views of components of an electronic knife system 1400 in accordance with some embodiments of the present technology. As illustrated in FIG. 14, the system includes an electronic knife 1410 and an electronic knife hub 1430. In the illustrated embodiment, the electronic knife hub 1430 is a magnetic strip holder that includes a housing 1432 configured to retain a blade 1412 of the electronic knife 1410 against the housing 1432, internal electronics 1434, and status indicators 1436. As discussed in more detail below, the electronic knife hub 1430 can be configured to store and deliver a charge to the electronic knife 1410; communicate with the electronic knife 1410 to download data from and/or send data or updates to the electronic knife 1410; and/or perform various other suitable functions.

As illustrated in FIG. 15, the housing 1432 of electronic knife hub 1430 includes a power supply 1440, one or more magnetic components 1442 (one labeled), and one or more transmission coils 1438 (one labeled). The power supply can be an internal battery and/or any suitable wall connected power supply capable of charging one or more electronic knives 1410 (one shown) at a time. In embodiments in which the power supply 1440 is a battery, the power supply 1440 can be a rechargeable battery connectable to a power outlet, USB 5V outlet, and/or another suitable power source.

The magnetic components 1442 can be embedded in a recessed cavity in the housing 1432 and/or carried within the housing 1432. Further, the magnetic components 1442 can be a continuous strip, or discrete magnetic components configured to hold the electronic knife 1410 in a predetermined position. The predetermined position can be selected to improve (or ensure) alignment between at least one of the transmission coils 1438 and the power receiving component within the electronic knife 1410 (e.g., the power receiver 564 discussed above with respect to FIGS. 5A and 5B).

In some embodiments, the internal electronics 1434 include a communication component that can communicate with the electronic knife 1410 (e.g., using an NFC element, Bluetooth® component, or other near-range wireless communication protocol) and/or over a network (e.g., the internet). In some embodiments, the internal electronics 1434 communicates with the electronic knife 1410 to receive information from the electronic knife 1410, such as data related to usage statistics, health status, oscillating frequencies (and observed resonant frequencies) for a given blade, user technique data, and the like. The internal electronics 1434 can additionally, or alternatively, communicate with the electronic knife 1410 to provide software updates to the microcontroller, to provide inputs on an expected resonant frequency (e.g., the center frequency and/or bandwidth parameters), and the like. The internal electronics 1434 can additionally, or alternatively, communicate with one or more devices over a network (e.g., the server 250 discussed above with respect to FIG. 2) to relay data, receive software updates, and the like.

In some embodiments, the indicators 1436 communicate the status of the power supply 1440 and/or the charging status of the electronic knife 1410. In some embodiments, indicators 1436 are a set of LED indicators and/or another suitable lighting element. In some embodiments, the indicators 1436 illuminate whenever a knife is attached to or removed from the electronic knife hub 1430 and/or or when the power supply 1440 is connected to or disconnected from an external power source.

In some embodiments, the housing 1432 of the electronic knife hub 1430 is made from a high quality, attractive material such as a natural hardwood. In some embodiments, the rear of the electronic knife hub 1430 is attached to a wall using an integral hanging point, via double-stick tape and/or another suitable non-destructive methods to hang an item on tile, stone, wood, or sheetrock walls.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A handheld electric knife comprising:
a blade; and
a handle operatively coupled to the blade and including an autotuning actuator assembly configured to oscillate the blade relative to the handle at a frequency selected based on a resonance frequency of at least one of the electric knife or the blade and obtain one or more measurements during oscillation of the blade, wherein the autotuning actuator assembly is programmed to adjust the frequency based on the obtained one or more measurements.

2. The handheld electric knife of example 1 wherein the autotuning actuator assembly includes:
a power supply,
an actuator electrically coupled to the power supply and configured to cause the blade to oscillate at the frequency,
at least one sensor configured to obtain the one or more measurements, and
a controller in communication with the actuator and the at least one sensor and configured to wirelessly communicate with a remote computing device, the controller is programmed to control the actuator to adjust the frequency to keep elastic deformation of the blade relative to a midplane of the blade below a target level.

3. The handheld electric knife of any of examples 1 and 2, wherein the autotuning actuator assembly includes an actuator and a controller programmed to adjust the operating frequency of the actuator based on the one or more measurements to compensate for at least one of a spatial position of the electronic knife, a spatial orientation of the handheld electric knife, a mass of a user's hand, a grip of the user's hand, or a resistance to the oscillation of the blade.

4. The handheld electric knife of any of examples 1-3, wherein the autotuning actuator assembly includes:
an oscillator operably coupled to the blade and configured to cause the blade to oscillate;
at least one sensor configured to obtain the one or more measurements, the one or more measurements including the at least one of a spatial position of the handheld electric knife, a spatial orientation of the handheld electric knife, a mass of a user's hand, a grip of the user's hand, or a resistance to the oscillation of the blade;
a controller operably coupled to the oscillator and the least one sensor, wherein the controller stores instructions that when executed cause the controller to adjust an operating frequency of the oscillator based at least partially on the one or more measurements from the at least one sensor; and
a power supply operably coupled to the oscillator, the least one sensor, and the controller.

5. The handheld electric knife of example 4 wherein the autotuning actuator assembly is programmed to determine a resonant frequency for the oscillation of the blade when the knife is held in a user's hand based on measurements from the least one sensor, wherein the resonant frequency is affected by one or more of a mass of the user's hand, the user's grip, and an object being cut by the blade, and wherein the autotuning actuator assembly adjusts an operational speed of the oscillator based at least partially on the determined resonant frequency.

6. The handheld knife of any of examples 1-5 wherein the autotuning actuator assembly includes:
a first oscillator configured to cause the blade to oscillate in a first direction,
a second oscillator configured to cause the blade to oscillate in a second direction different from the first direction, and
a controller programmed to control the first and second oscillators.

7. The handheld electric knife of any of examples 1-6 wherein the first oscillator includes a linear actuator and/or a rotor with an unbalanced mass.

8. The handheld electric knife of any of examples 1-7 wherein the autotuning actuator assembly is programmed to adjust the oscillation frequency to maintain a mode shape of the blade while external forces are applied to the blade.

9. The handheld electric knife of any of examples 1-8 wherein the autotuning actuator assembly is programmed to adjust the oscillation frequency to maintain a mode shape of the blade while external forces are applied to the handle.

10. The handheld electric knife of any of examples 1-9 wherein the handle further includes a feedback component, the feedback component including at least one of a haptic feedback mechanism, indicator lights, speakers, and a digital display.

11. The handheld electric knife of example 10 wherein the feedback component indicates an angle of the blade with respect to a vertical axis.

12. The handheld electric knife of any of examples 10 and 11 wherein the feedback component provides at least one of:

a first indication to a user configured to aid the user in sharpening the blade, or a second indication to the user configured to aid the user in making a desired cut on an object using the handheld electric knife.

13. The handheld electric knife of any of examples 1-12 wherein the autotuning actuator assembly includes at least one sensor configured to generate signals indicative of at least one of a spatial position of the handheld electric knife, a spatial orientation of the handheld electric knife, a mass of a user's hand, a grip of the user's hand, and a resistance to the oscillation of the blade.

14 The handheld electric knife of any of examples 1-13 wherein the autotuning actuator assembly includes a plurality of executable cutting programs for cutting foodstuff.

15. The handheld electric knife of any of examples 1-14 wherein the autotuning actuator assembly is programmed to:

receive user input, and control oscillation of the blade such that the blade is in plurality of predetermined modes based on the received user input.

16. The handheld electric knife of any of examples 1-15 wherein the autotuning actuator assembly is programmed to:

determine a dominant mode of vibration for the blade or the knife, and control oscillation of the blade to achieve the dominant mode of vibration.

17. The handheld electric knife of any of examples 1-16 wherein the autotuning actuator assembly is programmed to:

evaluate operation of the handheld knife cutting a subject material when held by a user, and adjust oscillation of the blade based on the evaluation to affect the cutting of the subject material.

18. The handheld electric knife of any of examples 1-17 wherein the autotuning actuator assembly includes a communication component configured to wirelessly communicate with a remote electronic device.

19. An electronic knife, comprising:

a blade;

a handle operably couplable to the blade, wherein the handle includes:

an oscillator operably coupled to the blade and configured to cause the blade to oscillate;

at least one sensor configured to obtain one or more measurements, the one or more measurements including the at least one of a spatial position of the electronic knife, a spatial orientation of the electronic knife, a mass of a user's hand, a grip of the user's hand, and a resistance to the oscillation of the blade;

a controller operably coupled to the oscillator and the least one sensor, wherein the controller stores instructions that when executed cause the controller to adjust an operating frequency of the oscillator based at least partially on the one or more measurements from the at least one sensor; and a power supply operably coupled to the oscillator, the least one sensor, and the controller.

20. The electronic knife of example 19 wherein the instructions further cause the controller to determine a resonant frequency for the oscillation of the blade in a user's hand based on measurements from the least one sensor, wherein the resonant frequency is affected by one or more of a mass of the user's hand, the user's grip, and an object being cut by the blade, and wherein the controller adjusts the speed of the oscillator based at least partially on the resonant frequency.

21. The electronic knife of any of examples 19 and 20 wherein the oscillator is a first oscillator configured to cause the blade to oscillate in a first direction, and wherein the handle further includes a second oscillator configured to cause the blade to oscillate in a second direction different from the first direction.

22. The electronic knife of any of examples 19-21 wherein the handle further includes a feedback component, the feedback component including at least one of a haptic feedback mechanism, indicator lights, speakers, and a digital display.

23. The electronic knife of example 22 wherein the feedback component indicates an angle of the blade with respect to a vertical axis.

24. The electronic knife of example 22 wherein the feedback component provides at least one of: instructions to a user on how to sharpen the blade and instructions to a user on how to appropriately cut an object using the electronic knife.

25. The electronic knife of any of examples 19-24 wherein the handle further includes a communication component configured to wirelessly communicate with a remote electronic device.

26. The electronic knife of example 25 wherein the instructions further cause the controller to download, through the communications component, one or more updates from the remote electronic device.

27. The electronic knife of any of examples 19-26 wherein the power supply includes a secondary cell, and wherein the handle further includes a receiving coil electrically coupled to the power supply, wherein the receiving coil is configured to generate an electric current to deliver power to the secondary cell in the power supply in response to a magnetic field on the receiving coil.

28. An interconnected electronic knife system, comprising:

an electronic knife having a blade and handle assembly operably coupled to the blade, wherein the handle assembly includes:

an actuator operably coupled to the blade and configured to cause the blade to oscillate;

at least one sensor configured to generate signals indicative of at least one of a spatial position of the electronic knife, a spatial orientation of the electronic knife, a mass of a user's hand, a grip of the user's hand, and a resistance to the oscillation of the blade;

a controller operably coupled to the actuator and the least one sensor, wherein the controller is configured to adjust an operating parameter of the actuator based at least partially on signals from the sensor; and a power supply operably coupled to the actuator, the least one sensor, and the controller;

a remote electronic device in wireless communication with the electronic knife; and a wireless charging device coupleable to the power supply of the electronic knife to deliver electrical power to the power supply.

29 The interconnected electronic knife system of example 28 wherein the handle assembly further includes a receiving coil electrically coupled to the power supply, and wherein the wireless charging device includes at least one charging coil positioned to generate a magnetic field incident on the receiving coil in the handle assembly to generate an electric current in the receiving coil.

30. The interconnected electronic knife system of example 29 wherein the wireless charging device further includes a permanent magnet configured to attract the blade of the electronic knife to secure the electronic knife in a charging position, and wherein, when the electronic knife is in the charging position, the receiving coil in the handle assembly is aligned with the at least one charging coil in the wireless charging device.

31. The interconnected electronic knife system of any of examples 28-30 wherein the controller is communicably coupled to the remote electronic device, and wherein the controller is further configured to transmit usage data to the remote electronic device related to the signals from the sensor.

32. The interconnected electronic knife system of any of examples 28-31 wherein the controller is communicably coupled to the remote electronic device, and wherein the remote electronic device is configured to transmit one or more operating updates to the controller.

33. The interconnected electronic knife system of any of examples 28-32 wherein the controller is communicably coupled to the remote electronic device, wherein the controller is further configured to transmit an operating status to the remote electronic device, and wherein the remote electronic device is configured to display instructions to a user for using the electronic knife based on the operating status.

34. The interconnected electronic knife system of any of examples 10-15 wherein the controller is communicably coupled to the remote electronic device, wherein the controller is further configured to transmit feedback to the remote electronic device during knife sharpening, and wherein the remote electronic device is configured to display instructions to a user for sharpening the blade of the electronic knife based at least partially on the feedback.

35. The interconnected electronic knife system of any of examples 28-34 wherein the controller is further configured to determine a resonant frequency for the oscillation of the blade in a user's hand based on the signals from sensor.

36. The interconnected electronic knife system of any of examples 28-35 wherein the handle assembly further includes a feedback component, the feedback component including at least one of a haptic feedback mechanism, indicator lights, speakers, and a digital display.

37. A method for adjusting operational parameters of an electronic knife, the method comprising:

receiving, from a sensor incorporated into the electronic knife, at least one measurement indicative of a change in operating conditions for the electronic knife;

generating a modal analysis of the operational parameters of the electronic knife based at least partially on the change in the operating conditions, wherein the modal analysis indicates resonant operational parameters of the electronic knife; and adjusting the operational parameters to match the resonant operational parameters.

38. The method of example 37 wherein the operating conditions include at least one of: a mass of a user's hand, a mass of a blade of the electronic knife, a density of a medium the electronic knife is operating in, and an input voltage of the electronic knife.

39. A cordless, handheld knife with enhanced cutting power generated by mechanically oscillating the cutting edge via a system of transducers or equivalent actuators.

40. A cordless, handheld knife with embedded electronics to generate, measure, and/or tune the oscillating mechanical motion of the cutting edge.

41. A cordless, handheld knife configured to measure and react to sensor data from one or more embedded sensors, accelerometers, gyroscopes, and/or multi-axis accelerometer/gyroscopic sensors.

42. A cordless, handheld knife with embedded electronics for user feedback, including but not limited to haptic feedback mechanisms, indicator lights, speakers or other audible feedback devices, and embedded digital displays.

43. A cordless, handheld knife with electronics for communicating wirelessly with other devices, including but not limited to Bluetooth, WiFi, and Near-field communications (NFC) with smartphones, computers, and other wireless computing devices for the purpose of providing data from the knife to the connected device, or to provide data from the connected device to the knife's embedded electronics.

44. A cordless, handheld knife handle with integrated electronics for generating oscillation in a removable or interchangeable blade and sensing and communicating as described in the claims above.

45. A method for recharging one or more batteries of a cordless, handheld knife.

46. A cordless, handheld knife that indicates its orientation with respect to gravity (multi-axis level) for the purpose of assisting in producing parallel, handheld cuts, for indicating a precise blade angle for sharpening, or for other purposes where orientation information assists a user in performing a movement with the knife.

47. A cordless, handheld knife with embedded electronics to determine an oscillating frequency associated with a target modal shape of a blade of the electronic knife.

48. A cordless, handheld knife with embedded electronics to reciprocate mechanical motion of a blade to maintain a target modal shape of the blade.

49. A cordless, handheld knife with embedded electronics to determine a natural resonance frequency associated with a blade of the electronic knife under known or measured operating parameters.

50. A cordless, handheld knife with embedded electronics to reciprocate mechanical motion of a blade at a natural resonance frequency associated with the blade under known or measured operating parameters.

CONCLUSION

Embodiments of the present disclosure may include some or all of the following components: a battery, supercapacitor, or other suitable power source; a microcontroller, FPGA, ASIC, or other programmable component or system capable of storing and executing software and/or firmware that drives operation of an implant; non-programmable components (e.g., diodes, comparators, gates, MOSFETS, etc.) that drive operation of an implant; memory such as RAM or ROM to store data and/or software/firmware associated with an implant and/or its operation; wireless communication hardware such as an antenna system or transmitter/receiver configured to transmit via Bluetooth, WiFi, or other protocols known in the art; energy harvesting means, for example a coil or antenna which is capable of receiving and/or reading an externally-provided signal which may be used to power the electronic knife, charge a battery, initiate a reading from a sensor, or for other purposes. Embodiments may also include one or more sensors, such as pressure sensors, impedance sensors, accelerometers, gyroscopes, multi-axis accelerometer/gyroscopic sensors, force/strain sensors, temperature sensors, flow sensors, optical sensors, cameras, microphones or other acoustic sensors, ultrasonic sensors, and other sensors adapted to measure various operation parameters of the electronic knife.

Embodiments of the present disclosure may be implemented as computer-executable instructions, such as routines executed by a general-purpose computer, a personal computer, a server, or other computing system. The present technology can also be embodied in a special purpose computer or data processor that is specifically programmed, configured, or constructed to perform one or more of the computer-executable instructions explained in detail herein. The terms "computer" and "computing device," as used generally herein, refer to devices that have a processor and non-transitory memory, as well as any data processor or any device capable of communicating with a network. Data processors include programmable general-purpose or special-purpose microprocessors, programmable controllers, ASICs, programming logic devices (PLDs), or the like, or a combination of such devices. Computer-executable instructions may be stored in memory, such as RAM, ROM, flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed:

1. An electronic knife, comprising:
a blade:
a handle operably couplable to the blade, wherein the handle includes:
   an oscillator operably coupled to the blade and configured to cause the blade to oscillate:
   at least one sensor configured to obtain one or more measurements, the one or more measurements including the at least one of a spatial position of electronic knife, a spatial orientation of the electronic knife, a mass of a user's hand, a grip of the user's hand, or a resistance to the oscillation of the blade;
   a controller operably coupled to the oscillator and the least one sensor wherein the controller stores instructions that when executed cause the controller to adjust an operating frequency of the oscillator based at least partially on the one or more measurements from the at least one sensor;
   a power supply operably coupled to the oscillator, the least one sensor, and the controller; and
   a communication component configured to wirelessly communicate with a remote electronic device.

2. The electronic knife of claim 1 wherein the instructions further cause the controller to download, through the communications component, one or more updates from the remote electronic device.

3. The electronic knife of claim 1 wherein the power supply includes a secondary cell, and wherein the handle further includes a receiving coil electrically coupled to the power supply, wherein the receiving coil is configured to generate an electric current to deliver power to the secondary cell in the power supply in response to a magnetic field on the receiving coil.

4. An interconnected electronic knife system, comprising:
an electronic knife having a blade and handle assembly operably coupled to the blade, wherein the handle assembly includes:
   an actuator operably coupled to the blade and configured to cause the blade to oscillate;
   at least one sensor configured to generate signals indicative of at least one of a spatial position of the electronic knife, a spatial orientation of the electronic knife, a mass of a user's hand, a grip of the user's hand, and a resistance to the oscillation of the blade;
   a controller operably coupled to the actuator and the least one sensor, wherein the controller is configured to adjust an operating parameter of the actuator based at least partially on signals from the sensor; and a power supply operably coupled to the actuator, the least one sensor, and the controller;

a remote electronic device in wireless communication with the electronic knife; and a wireless charging device coupleable to the power supply of the electronic knife to deliver electrical power to the power supply.

5. The interconnected electronic knife system of claim 4 wherein the handle assembly further includes a receiving coil electrically coupled to the power supply, and wherein the wireless charging device includes at least one charging coil positioned to generate a magnetic field incident on the receiving coil in the handle assembly to generate an electric current in the receiving coil.

6. The interconnected electronic knife system of claim 5 wherein the wireless charging device further includes a permanent magnet configured to attract the blade of the electronic knife to secure the electronic knife in a charging position, and wherein, when the electronic knife is in the charging position, the receiving coil in the handle assembly is aligned with the at least one charging coil in the wireless charging device.

7. The interconnected electronic knife system of claim 4 wherein the controller is communicably coupled to the remote electronic device, and wherein the controller is further configured to transmit usage data to the remote electronic device related to the signals from the sensor.

8. The interconnected electronic knife system of claim 4 wherein the controller is communicably coupled to the remote electronic device, and wherein the remote electronic device is configured to transmit one or more operating updates to the controller.

9. The interconnected electronic knife system of claim 4 wherein the controller is communicably coupled to the remote electronic device, wherein the controller is further configured to transmit an operating status to the remote electronic device, and wherein the remote electronic device is configured to display instructions to a user for using the electronic knife based on the operating status.

10. The interconnected electronic knife system of claim 4 wherein the controller is communicably coupled to the remote electronic device, wherein the controller is further configured to transmit feedback to the remote electronic device during knife sharpening, and wherein the remote electronic device is configured to display instructions to a user for sharpening the blade of the electronic knife based at least partially on the feedback.

11. The interconnected electronic knife system of claim 4 wherein the controller is further configured to determine a resonant frequency for the oscillation of the blade in a user's hand based on the signals from sensor.

12. The interconnected electronic knife system of claim 4 wherein the handle assembly further includes a feedback component, the feedback component including at least one of a haptic feedback mechanism, indicator lights, speakers, and a digital display.

13. A method for adjusting operational parameters of an electronic knife, the method comprising:

receiving, from a sensor incorporated into the electronic knife, at least one measurement indicative of a change in operating conditions for the electronic knife;

generating a modal analysis of the operational parameters of the electronic knife based at least partially on the change in the operating conditions, wherein the modal analysis indicates resonant operational parameters of the electronic knife; and adjusting the operational parameters to match the resonant operational parameters.

14. The method of claim 13 wherein the operating conditions include at least one of: a mass of a user's hand, a mass of a blade of the electronic knife, a density of a medium the electronic knife is operating in, and an input voltage of the electronic knife.

15. The interconnected electronic knife system of claim 4, wherein the handle assembly comprises a tang configured to receive and hold the actuator such that the actuator oscillates in a direction generally perpendicular to a midplane of the tang.

16. The interconnected electronic knife system of claim 4, further comprising a plurality of actuators stacked in a transverse direction relative to a handle body of the handle assembly.

17. A handheld electric knife comprising:

a blade; and a handle operatively coupled to the blade and including an autotuning actuator assembly configured to oscillate the blade relative to the handle at a frequency selected based on a resonance frequency of at least one of the electric knife or the blade and obtain one or more measurements during oscillation of the blade, wherein the autotuning actuator assembly includes a plurality of actuators stacked in a transverse direction relative to a handle body of the handle assembly and operable to adjust the frequency of oscillations of the blade based on the obtained one or more measurements.

* * * * *